(12) United States Patent
Yang et al.

(10) Patent No.: US 12,190,505 B2
(45) Date of Patent: Jan. 7, 2025

(54) ROBUST DEEP AUC/AUPRC MAXIMIZATION: A NEW SURROGATE LOSS AND EMPIRICAL STUDIES ON MEDICAL IMAGE CLASSIFICATION

(71) Applicant: University of Iowa Research Foundation, Iowa City, IA (US)

(72) Inventors: Tianbao Yang, Iowa City, IA (US); Zhuoning Yuan, Iowa City, IA (US); Yan Yan, Pullman, WA (US); Qi Qi, Coralville, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 446 days.

(21) Appl. No.: 17/540,472

(22) Filed: Dec. 2, 2021

(65) Prior Publication Data
US 2022/0172356 A1  Jun. 2, 2022

Related U.S. Application Data

(60) Provisional application No. 63/120,491, filed on Dec. 2, 2020.

(51) Int. Cl.
*G06T 7/00* (2017.01)
*G06F 17/18* (2006.01)
(Continued)

(52) U.S. Cl.
CPC ............. *G06T 7/0012* (2013.01); *G06F 17/18* (2013.01); *G06V 10/30* (2022.01); *G06V 10/82* (2022.01); *G06T 2207/10116* (2013.01)

(58) Field of Classification Search
CPC ......... G06T 7/0012; G06T 2207/10116; G06T 2207/10024; G06T 2207/20081;
(Continued)

(56) References Cited

U.S. PATENT DOCUMENTS

| | | | |
|---|---|---|---|
| 10,217,029 B1* | 2/2019 | Van Rensburg | ..... G06V 40/174 |
| 2009/0118600 A1* | 5/2009 | Ortiz | ..................... A61B 5/0064 |
| | | | 600/306 |

(Continued)

OTHER PUBLICATIONS

Aaron Defazio and Leon Bottou. On the ineffectiveness of variance reduced optimization for deep learning. In Advances in Neural Information Processing Systems, pp. 1753-1763, 2019.
(Continued)

*Primary Examiner* — Dhaval V Patel
(74) *Attorney, Agent, or Firm* — Goodhue, Coleman & Owens, P.C.

(57) ABSTRACT

A computer-based automated method of performing classification includes learning a deep neural network by maximizing an area under a receiver operating characteristic curve (AUC) or precision-recall curve (AUPRC) score wherein a margin-based surrogate loss function is applied, receiving an input into a deep neural network, and processing the input to the deep neural network to generate a prediction, wherein the prediction comprises a classification of the input. The computer-based automated method may be performed by executing instructions in at least one processor, and wherein said instructions are stored on a non-transitory memory readable by the at least one processor.

20 Claims, 15 Drawing Sheets

(51) Int. Cl.
*G06V 10/30* (2022.01)
*G06V 10/82* (2022.01)

(58) Field of Classification Search
CPC ........... G06T 2207/20084; G06T 2207/30061; G06T 2207/30088; G06T 2207/30096; G06F 17/18; G06V 10/30; G06V 10/82; G06V 2201/03; G06N 3/045; G06N 3/08
See application file for complete search history.

(56) References Cited

U.S. PATENT DOCUMENTS

| | | | | |
|---|---|---|---|---|
| 2018/0357566 | A1* | 12/2018 | Liu | G06N 7/01 |
| 2020/0005900 | A1* | 1/2020 | Cha | G16H 10/40 |
| 2020/0167914 | A1* | 5/2020 | Stamatoyannopoulos | G06N 20/00 |
| 2020/0311932 | A1* | 10/2020 | Hooper | G06F 18/2413 |
| 2022/0414464 | A1* | 12/2022 | Krishnaswamy | G06N 3/047 |

OTHER PUBLICATIONS

Alan Herschtal and Bhavani Raskutti. Optimising area under the roc curve using gradient descent. In Proceedings of the twenty-first international conference on Machine learning, p. 49, 2004.

Anatoli Juditsky, Arkadi Nemirovski, and Claire Tauvel. Solving variational inequalities with stochastic mirror-prox algorithm. Stochastic Systems, 1(1):17-58, 2011.

Andre Esteva, Brett Kuprel, Roberto A Novoa, Justin Ko, Susan M Swetter, Helen M Blau, and Sebastian Thrun. Dermatologist-level classification of skin cancer with deep neural networks. nature, 542(7639):115-118, 2017.

Arkadi Nemirovski. Prox-method with rate of convergence o (1/t) for variational inequalities with lipschitz continuous monotone operators and smooth convex-concave saddle point problems. SIAM Journal on Optimization, 15(1):229-251, 2004.

Bingyi Kang, Saining Xie, Marcus Rohrbach, Zhicheng Yan, Albert Gordo, Jiashi Feng, and Yannis Kalantidis. Decoupling representation and classifier for long-tailed recognition. In International Conference on Learning Representations, 2020, 16 pages.

Boris Teodorovich Polyak. Gradient methods for minimizing functionals. Zhurnal Vychislitel'noi Matematiki i Matematicheskoi Fiziki, 3(4):643-653, 1963.

Chi Jin, Praneeth Netrapalli, and Michael I Jordan. What is Local Optimality in Nonconvex-Nonconcave Minimax Optimization?. International Conf. on Machine Learning, PMLR 119 2020, 10 pages.

Elad Hazan and Satyen Kale. Beyond the regret minimization barrier: Optimal algorithms for stochastic strongly- convex optimization. Journal of Machine Learning Research, 15(71):2489-2512, 2014.

Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.

Guo et al. (2020). "Fast Objective and Duality Gap Convergence for Non-convex Strongly-concave Min-max Problems." 36 pages.

Guo et al. (2020, ICML). "Communication-Efficient Distributed Stochastic AUC Maximization with Deep Neural Networks."

Hamed Karimi, Julie Nutini, and Mark Schmidt. Linear convergence of gradient and proximal-gradient methods under the polyak-lojasiewicz condition. In Joint European Conference on Machine Learning and Knowledge Discovery in Databases, pp. 795-811. Springer, 2016.

Hieu H. Pham, Tung T. Le, Dat T. Ngo, Dat Q. Tran, and Ha Q. Nguyen. Interpreting chest x-rays via fonngs that exploit hierarchical disease dependencies and uncertainty labels. In Medical Imaging with Deep Learning, 2020.

Hongseok Namkoong and John C Duchi. Stochastic gradient methods for distributionally robust optimization with f-divergences. In Advances in neural information processing systems, 17 pages, 2016.

Hongseok Namkoong and John C Duchi. Variance-based regularization with convex objectives. In Advances in neural Information processing systems, pp. 2971-2980, 2017.

James A Hanley and Barbara J McNeil. The meaning and use of the area under a receiver operating characteristic (roc) curve. Radiology, 143(1):29-36, 1982.

Jeremias Sulam, Rami Ben-Ari, and Pavel Kisilev. Maximizing auc with deep learning for classification of imbalanced mammogram datasets. In VCBM, pp. 131-135, 2017.

Jeremy Elson, John R Douceur, Jon Howell, and Jared Saul. Asirra: a captcha that exploits interest-aligned manual image categorization. In ACM Conference on Computer and Communications Security, vol. 7, pp. 366-374, 2007.

Jeremy Irvin, Pranav Rajpurkar, Michael Ko, Yifan Yu, Silviana Ciurea-Ilcus, Chris Chute, Henrik Marklund, Behzad Haghgoo, Robyn Ball, Katie Shpanskaya, et al. Chexpert: A large chest radiograph dataset with uncertainty labels and expert comparison. In Proceedings of the AAAI Conference on Artificial Intelligence, vol. 33, pp. 590-597, 2019.

John Duchi, Elad Hazan, and Yoram Singer. Adaptive subgradient methods for online learning and stochastic optimization. Journal of machine learning research, Jul. 12:2121-2159, 2011.

Junchi Yang, Negar Kiyavash, and Niao He. Global convergence and variance-reduced optimization for a class of honconvex-nonconcave minimax problems. arXiv preprint arXiv:2002.09621, 2020.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Kaiming He, Xiangyu Zhang, Shaoqing Ren, and Jian Sun. Identity mappings in deep residual networks. In European conference on computer vision, pp. 630-645. Springer, 2016.

Lam M Nguyen, Jie Liu, Katya Scheinberg, and Martin Tak'ac. Stochastic recursive gradient algorithm for nonconvex optimization. arXiv preprint arXiv:1705.07261, 15 pages, 2017.

Leslie N Smith. Cyclical learning rates for training neural networks. In 2017 IEEE Winter Conference on Applications of Computer Vision (WACV), pp. 464-472. IEEE, 2017.

Lihua Lei, Cheng Ju, Jianbo Chen, and Michael I Jordan. Nonconvex finite-sum optimization via scsg methods. In Advances in Neural Information Processing Systems, pp. 2348-2358, 2017.

Liu et al. (2020, ICLR). "Stochastic AUC Maximization with Deep Neural Networks." 23 pages.

Luo Luo, Haishan Ye, and Tong Zhang. Stochastic recursive gradient descent ascent for stochastic nonconvex-strongly-concave minimax problems. CoRR, abs/2001.03724, 28 pages, 2020.

Maher Nouiehed, Maziar Sanjabi, Tianjian Huang, Jason D Lee, and Meisam Razaviyayn. Solving a class of non-convex min-max games using iterative first order methods. In Advances in Neural Information Processing Systems, 27 pages, 2019.

Maziar Sanjabi, Meisam Razaviyayn, and Jason D Lee. Solving non-convex non-concave min-max games under polyak-l ojasiewicz condition. arXiv preprint arXiv:1812.02878, 2018.

Michael Natole, Yiming Ying, and Siwei Lyu. Stochastic proximal algorithms for auc maximization. In International Conference on Machine Learning, pp. 3710-3719, 2018.

Mingrui Liu, Xiaoxuan Zhang, Zaiyi Chen, Xiaoyu Wang, and Tianbao Yang. Fast stochastic auc maximization with o (1=n)-convergence rate. In International Conference on Machine Learning, pp. 3189-3197, 2018.

Mingrui Liu, Youssef Mroueh, Jerret Ross, Wei Zhang, Xiaodong Cui, Payel Das, and Tianbao Yang. Towards better understanding of adaptive gradient algorithms in generative adversarial nets. In International Conference on Learning Representations, 23 pages, 2020.

Mingxing Tan and Quoc V Le. Efficientnet: Rethinking model scaling for convolutional neural networks. International Conf. on Machine Learning, PMLR 97, 2019, 10 pages.

(56) References Cited

OTHER PUBLICATIONS

Moritz Hardt and Tengyu Ma. Identity matters in deep learning. arXiv preprint arXiv:1611.04231, 2018, 20 pages.

Nan Wu, Jason Phang, Jungkyu Park, Yiqiu Shen, Zhe Huang, Masha Zorin, Stanislaw Jastrzkebski, Thibault Fevry, Joe Katsnelson, Eric Kim, et al. Deep neural networks improve radiologists' performance in breast cancer screening. IEEE transactions on medical imaging, 39(4):1184-1194, 2019.

Peilin Zhao, Steven C. H. Hoi, Rong Jin, and Tianbao Yang. Online auc maximization. In ICML, pp. 233-240 2011.

Qihang Lin, Mingrui Liu, Hassan Rafique, and Tianbao Yang. Solving weaklyconvex-weakly-concave saddle-point problems as weakly-monotone variational inequality. arXiv preprint arXiv:1810.10207, 22 pages, 2018.

Qishen Ha, Bo Liu, and Fuxu Liu. Identifying melanoma images using efficientnet ensemble: Winning solution to the siim-isic melanoma classification challenge. arXiv preprintarXiv:2010.05351, 2020, 6 pages.

R Tyrrell Rockafellar. Monotone operators and the proximal point algorithm. SIAM journal on control and optimization, 14(5):877-898, 1976.

Sanjeev Arora, Nadav Cohen, Noah Golowich, and Wei Hu. A convergence analysis of gradient descent for deep inear neural networks. arXiv preprint arXiv:1810.02281, 2019, 35 pages.

Sashank J Reddi, Ahmed Hefny, Suvrit Sra, Barnab'as P'oczos, and Alex Smola. Stochastic variance reduction for honconvex optimization. In International conference on machine learning (48), pp. 314-323, 2016.

Simon S Du, Xiyu Zhai, Barnabas Poczos, and Aarti Singh. Gradient descent provably optimizes over-parameterized neural networks. arXiv preprint arXiv:1810.02054, 2018, 19 pages.

Songtao Lu, Ioannis Tsaknakis, Mingyi Hong, and Yongxin Chen. Hybrid block successive approximation for one-sided hon-convex min-max problems: Algorithms and applications. arXiv preprint arXiv:1902.08294, 20 pages, 2019.

Stephan Clemenc,on, Gabor Lugosi, Nicolas Vayatis, et al. Ranking and empirical minimization of u-statistics. The Annals of Statistics, 36(2):844-874, 2008.

Thorsten Joachims. A support vector method for multivariate performance measures. In Proceedings of the 22nd International conference on Machine learning, pp. 377-384, 2005.

Tianyi Lin, Chi Jin, and Michael I Jordan. On gradient descent ascent for nonconvexconcave minimax problems. International Conf. on Machine Learning, 119, 11 pages, 2020.

Tianyi Lin, Chi Jin, Michael Jordan, et al. Near-optimal algorithms for minimax optimization. Proceedings of machine Learning Research 125, pp. 1-42, 2020.

Tsung-Yi Lin, Priya Goyal, Ross Girshick, Kaiming He, and Piotr Dollar. Focal loss for dense object detection. In Proceedings of the IEEE international conference on computer vision, pp. 2980-2988, 2017.

Amirreza Mahbod et al. The international skin imaging collaboration (isic). https://www.isic-archive.com/. Aug. 2020. 12 pages.

Balasubramanian, K., Ghadimi, S., and Nguyen, A. Stochastic multi-level composition optimization algorithms with level-independent convergence rates. CoRR, abs/2008.10526, 2021. 27 pages.

Boyd, K., Eng, K. H., and Page, C. D. Area under the precision-recall curve: Point estimates and confidence intervals. In Blockeel, H., Kersting, K., Nijssen, S., and Zelezny, F. (eds.), Machine Learning and Knowledge Discovery in Databases, pp. 451-466, Berlin, Heidelberg, 2013. Springer Berlin Heidelberg.

Brown, A., Xie, W., Kalogeiton, V., and Zisserman, A. Smooth-ap: Smoothing the path towards large-scale image retrieval. In European Conference on Computer Vision, pp. 677-694. Springer, 2020.

Burges, C., Ragno, R., and Le, Q. Learning to rank with nonsmooth cost functions. In Scholkopf, B., Platt, J., and Hoffman, T. (eds.), Advances in Neural Information Processing Systems, vol. 19. MIT Press, 2007. 8 pages.

Cao, K., Wei, C., Gaidon, A., Arechiga, N., and Ma, T. Learning imbalanced datasets with label-distribution-aware margin loss. In Advances in Neural Information Processing Systems, pp. 1567-1578, 2019.

Chen, K., Li, J., Lin, W., See, J., Wang, J., Duan, L., Chen, Z., He, C., and Zou, J. Towards accurate one-stage object detection with ap-loss. In Proceedings of the IEEE/CVF Conference on Computer Vision and Pattern Recognition (CVPR), Jun. 2019. pp. 5119-5127.

Chen, K., Lin, W., See, J., Wang, J., Zou, J., et al. Ap-loss for accurate one-stage object detection. IEEE Transactions on Pattern Analysis and Machine Intelligence, 2020.

Chen, T., Sun, Y., and Yin, W. Solving stochastic compositional optimization is nearly as easy as solving stochastic optimization. IEEE Transactions on Signal Processing, 69:4937-4948, 2021.

Chen, W., Liu, T.-Y., Lan, Y., Ma, Z., and Li, H. Ranking measures and loss functions in learning to rank. In Proceedings of the 22nd International Conference on Neural Information Processing Systems, NIPS'09, pp. 315-323, Red Hook, NY, USA, 2009. Curran Associates Inc. ISBN 9781615679119.

Cui, Y., Jia, M., Lin, T.-Y., Song, Y., and Belongie, S. Class-balanced loss based on effective No. of samples. In Proceedings of the IEEE/CVF Conference on Computer Vision and Pattern Recognition, pp. 9268-9277, 2019.

Davis, J. and Goadrich, M. The Relationship Between Precision-Recall and ROC Curves. In ICML '06: Proceedings of the 23rd international conference on Machine learning, pp. 233-240, New York, NY, USA, 2006. ACM. ISBN 1-59593-383-2.

Dongruo Zhou, Pan Xu, and Quanquan Gu. Stochastic nested variance reduced gradient descent for nonconvex optimization. In Advances in Neural Information Processing Systems, pp. 3921-3932, 2018.

Gao, H., Wang, Z., and Ji, S. Large-scale learnable graph convolutional networks. In Proceedings of the 24th ACM SIGKDD International Conference on Knowledge Discovery & Data Mining, KDD '18, pp. 1416-1424, New York, NY, USA, 2018. Association for Computing Machinery.

Gilmer, J., Schoenholz, S. S., Riley, P. F., Vinyals, O., and Dahl, G. E. Neural message passing for quantum chemistry. In Precup, D. and Teh, Y. W. (eds.), Proceedings of the 34th International Conference on Machine Learning, vol. 70 of Proceedings of Machine Learning Research, pp. 1263-1272, International Convention Centre, Sydney, Australia, 2017.

Goadrich, M., Oliphant, L., and Shavlik, J. Gleaner: Creating ensembles of firstorder clauses to improve recall-precision curves. In Machine Learning, 64:231-261, 2006.

Henderson, P. and Ferrari, V. End-to-end training of object class detectors for mean aver-age precision. In Computer Vision—ACCV 2016, pp. 198-213. Springer International Publishing, 2017.

Hu, W., Liu, B., Gomes, J., Zitnik, M., Liang, P., Pande, V., and Leskovec, J. Strategies for pre-training graph neural hetworks. In Proceedings of the 7th international conference on learning representations, 2020. 22 pages.

Huo, Z., Gu, B., Liu, J., and Huang, H. Accelerated method for stochastic composition optimization with nonsmooth regularization. In McIlraith, S. A. and Weinberger, K. Q. (eds.), Proceedings of the Thirty-Second AAAI Conference on Artificial Intelligence, (AAAI-18), pp. 3287-3294, 2018.

Kipf, T. N. and Welling, M. Semi-supervised classification with graph convolutional networks. In 5th International Conference on Learning Representations, 2017. 14 pages.

Lian, X., Wang, M., and Liu, J. Finite-sum composition optimization via variance reduced gradient descent. In Proceedings of the 20th International Conference on Artificial Intelligence and Statistics (AISTATS), pp. 1159-1167, 2017.

Liu, L., Liu, J., Hsieh, C., and Tao, D. Stochastically controlled stochastic gradient for the convex and non-convex composition problem. CoRR, abs/1809.02505, 2018. 23 pages.

Metzler, D. and Croft, W. B. A markov random field model for term dependencies. In Proceedings of the 28th Annual International ACM SIGIR Conference on Research and Development in Information Retrieval, SIGIR, 2005.

(56) References Cited

OTHER PUBLICATIONS

Mingrui Liu, Zhuoning Yuan, Yiming Ying, and Tianbao Yang. Stochastic auc maximization with deep neural networks. arXiv preprint arXiv:1908.10831, 2020. 24 pages.

Mohapatra, P., Jawahar, C., and Kumar, M. P. Efficient optimization for average precision svm. In Advances in Neural Information Processing Systems, 2014. 9 pages.

Mohapatra, P., Rolinek, M., Jawahar, C. V., Kolmogorov, V., and Kumar, M. Efficient optimization for rank-based loss functions. 2018 IEEE/CVF Conference on Computer Vision and Pattern Recognition, pp. 3693-3701, 2018.

Narasimhan, H., Cotter, A., and Gupta, M. Optimizing generalized rate metrics with three players. In Wallach, H., Larochelle, H., Beygelzimer, A., d'Alché-Buc, F., Fox, E., and Garnett, R. (eds.), Advances in Neural Information Processing Systems, vol. 32. Cur-ran Associates, Inc., 2019. 12 pages.

Oksuz, K., Cam, B. C., Akbas, E., and Kalkan, S. A ranking-based, balanced loss function unifying classification and localisation in object detection. In Advances in Neural Information Processing Systems, 2021. 25 pages.

Qi, Q. Soap code for reproducing results. https://github.com/Optimization-AI, 2021. 14 pages.

Qin, T., Liu, T.-Y., and Li, H. A general approximation framework for direct optimization of information retrieval measures. Technical Report MSR-TR-2008-164, Nov. 2008. 27 pages.

Rolinek, M., Musil, V., Paulus, A., Vlastelica, M., Michaelis, C., and Martius, G. Optimizing rank-based metrics with blackbox differentiation. In Proceedings of the IEEE/CVF Conference on Computer Vision and Pattern Recognition (CVPR), Jun. 2020, pp. 7620-7630.

Song, Y., Schwing, A., Richard, and Urtasun, R. Training deep neural networks via direct loss minimization. In Balcan, M. F. and Weinberger, K. Q. (eds.), Proceedings of The 33rd International Conference on Machine Learning, vol. 48 of Proceedings of Machine Learning Research, pp. 2169-2177, New York, New York, USA, Jun. 20-22, 2016. PMLR.

Stokes, J. M., Yang, K., Swanson, K., Jin, W., Cubillos-Ruiz, A., Donghia, N. M., MacNair, C. R., French, S., Carfrae, L. A., Bloom-Ackerman, Z., et al. A deep learning approach to antibiotic discovery. Cell, 180(4):688-702, 2020.

Wang, M., Liu, J., and Fang, E. X. Accelerating stochastic composition optimization. Journal Machine Learning Research, 18:105:1-105:23, 2017.

Wang, Z., Liu, M., Luo, Y., Xu, Z., Xie, Y., Wang, L., Cai, L., Qi, Q., Yuan, Z., Yang, T., and Ji, S. Advanced graph and sequence neural networks for molecular property prediction and drug discovery, 2021, 28 pages.

Wu, Z., Ramsundar, B., Feinberg, E. N., Gomes, J., Geniesse, C., Pappu, A. S., Leswing, K., and Pande, V. MoleculeNet: a benchmark for molecular machine learning. Chemical science, 9 (2):513-530, 2018.

Xu, K., Hu, W., Leskovec, J., and Jegelka, S. How powerful are graph neural networks? In 7th International Conference on Learning Representations, 2019.

Yu, Y. and Huang, L. Fast stochastic variance reduced ADMM for stochastic composition optimization. In Proceedings of the Twenty-Sixth International Joint Conference on Artificial Intelligence (IJCAI), pp. 3364-3370, 2017.

Yue, Y., Finley, T., Radlinski, F., and Joachims, T. A support vector method for optimizing average precision. In Proceedings of the 30th Annual International Acm Sigir Conference on Research and Development in Information Retrieval, SIGIR '07, pp. 271-278, New York, NY, USA, 2007. Association for Computing Machinery.

Zhang, J. and Xiao, L. A composite randomized incremental gradient method. In Chaudhuri, K. and Salakhutdinov, R. (eds.), Proceedings of the 36th International Conference on Machine Learning (ICML), vol. 97, pp. 7454-7462, 2019.

Zhishuai Guo, Zhuoning Yuan, Yan Yan, and Tianbao Yang. Fast objective and duality gap convergence for nonconvex strongly-concave min-max problems. arXiv preprint arXiv:2006.06889, 2020. 36 pages.

Veronica Rotemberg, Nicholas Kurtansky, Brigid Betz-Stablein, Liam Caffery, Emmanouil Chousakos, Noel Codella, Marc Combalia, Stephen Dusza, Pascale Guitera, David Gutman, et al. A patient-centric dataset of images and metadata for identifying melanomas using clinical context. 2021, pp. 1-8.

Wei Gao and Zhi-Hua Zhou. On the consistency of auc pairwise optimization. In IJCAI, pp. 939-945. Citeseer, 2015.

Wei Gao, Rong Jin, Shenghuo Zhu, and Zhi-Hua Zhou. Onepass auc optimization. In International conference on machine learning (28), pp. 906-914, 2013.

Wenwu Ye, Jin Yao, Hui Xue, and Yi Li. Weakly supervised lesion localization with probabilistic-cam pooling, 2020, 6 pages.

Yan et al. (2020, NeurIPS). "Optimal Epoch Stochastic Gradient Descent Ascent Methods for Min-Max Optimization." 31 pages.

Yi Zhou and Yingbin Liang. Characterization of gradient dominance and regularity conditions for neural networks. arXiv preprint arXiv:1710.06910, 2017.

Yiming Ying, Longyin Wen, and Siwei Lyu. Stochastic online auc maximization. In Advances in neural information processing systems, pp. 451-459, 2016.

Yuanzhi Li and Yang Yuan. Convergence analysis of two-layer neural networks with relu activation. In Advances in neural information processing systems, 37 pages, 2017.

Yuanzhi Li and Yingyu Liang. Learning overparameterized neural networks via stochastic gradient descent on structured data. In Advances in Neural Information Processing Systems, pp. 8157-8166, 2018.

Zachary Charles and Dimitris Papailiopoulos. Stability and generalization of learning algorithms that converge to global optima. International Conf. on Machine Learning, PMLR 80, 2018, 10 pages.

Zeyuan Allen-Zhu, Yuanzhi Li, and Zhao Song. A convergence theory for deep learning via over-parameterization. International Conf. on Machine Learning, PMLR 97, 2019, 11 pages.

Zhishuai Guo, Mingrui Liu, Zhuoning Yuan, Li Shen, Wei Liu, and Tianbao Yang. Communication-efficient distributed stochastic AUC maximization with deep neural networks. In International Conference on Machine Learning, 2020.

Zhize Li and Jian Li. A simple proximal stochastic gradient method for nonsmooth nonconvex optimization. In Advances in neural information processing systems, 20 pages, 2018.

* cited by examiner

ROBUST DEEP AUC/AUPRC MAXIMIZATION: A NEW SURROGATE LOSS AND EMPIRICAL STUDIES ON MEDICAL IMAGE CLASSIFICATION

RELATED APPLICATIONS

This application claims priority to U.S. Provisional Patent Application No. 63/120,491, filed Dec. 2, 2020, hereby incorporated by reference in its entirety.

GRANT REFERENCE

This invention was made with government support NSF 1844403 awarded by the National Science Foundation; NSF 2110545 awarded by the National Science Foundation; and NSF 1933212 awarded by the National Science Foundation. The Government has certain rights in the invention.

FIELD OF THE INVENTION

The present invention relates to deep learning. More particularly, but not exclusively, the present invention relates to methods, apparatuses, and systems for deep learning using a robust deep AUC/AUPRC maximization for applications such as, but not limited to, medical image classification.

BACKGROUND

Deep learning has been applied in numerous applications. Such applications include medical image classification. Despite the use of deep learning in such applications, problems remain. For example, the area under a Receiver Operating Characteristic (ROC) curve (AUC) may be used to measure the quality of a classification algorithm. Most existing approaches for learning a deep neural network are based on optimizing the cross-entropy loss, which makes the model performance unstable on very imbalanced datasets. Learning a deep neural network by AUC maximization is more suitable for imbalanced data, e.g., medical images for identifying certain diseases. Although AUC maximization has been considered in the literature, all previous known work use a square surrogate loss of AUC in favor of large-scale optimization, which makes it sensitive to outliers and has adverse effect when trained using well classified data. What is needed are new methods, apparatus, and systems which improve over the state of the art in terms of computation efficiency, robustness, or other advantages.

SUMMARY

Therefore, it is a primary object, feature, or advantage of the present invention to improve over the state of the art.

It is a further object, feature, or advantage to optimize a novel loss for deep learning instead of optimizing a standard cross-entropy loss.

It is a still further object, feature, or advantage to maximize the AUC score (area under the ROC curve) for deep learning.

Another object, feature, or advantage is to a generic method that can further improve the performance of deep learning on medical datasets such as medical image data sets without relying on domain knowledge Yet another object, feature, or advantage is to provide for AUC maximization in a manner which is scalable.

A further object, feature, or advantage is to improve over issues associated with AUC square loss to provide a methodology which is more robust to noisy data and not adversely affected by well-classified data.

A still further object, feature, or advantage is to further improve the performance of deep learning for highly imbalanced data sets.

One or more of these and/or other objects, features, or advantages will become apparent from the present disclosure. It is to be understood that different embodiments or applications may have different objects, features, or advantages. Thus, no single embodiment need exhibit each and every object, feature, or advantage set forth herein and the present invention is not to be limited to or by these objects, features, or advantages.

Deep AUC Maximization (DAM) is a paradigm for learning a deep neural network by maximizing the AUC score of the model on a dataset. Most previous works of AUC maximization focus on the perspective of optimization by designing efficient stochastic algorithms, and studies on generalization performance of DAM on difficult tasks are missing. According to one aspect of this disclosure, we make DAM more practical for interesting real-world applications (e.g., medical image classification). First, we provide a new margin-based surrogate loss function for the AUC score (named as the AUC margin loss). It is more robust than the commonly used AUC square loss, while enjoying the same advantage in terms of large-scale stochastic optimization. Second, we conduct empirical studies of our DAM method on difficult medical image classification tasks, namely classification of chest x-ray images for identifying many threatening diseases and classification of images of skin lesions for identifying melanoma. Our DAM method has achieved great success on these difficult tasks, i.e., the 1st place on Stanford CheXpert competition (by the filing date) and Top 1% rank (rank 33 out of 3314 teams, our testing AUC=0.9438 vs winner's testing AUC=0.9490) on Kaggle 2020 Melanoma classification competition. We also conduct extensive ablation studies to demonstrate the advantages of the new AUC margin loss over the AUC square loss on benchmark datasets. To the best of our knowledge, this is the first work that makes DAM succeed on large-scale medical image datasets.

According to another aspect, a computer-based automated method of performing classification is performed. The method includes learning a deep neural network by maximizing an area under a receiver operating characteristic curve (AUC) score wherein a margin-based surrogate loss function is applied, receiving an input into a deep neural network, and processing the input to the deep neural network to generate a prediction, wherein the prediction comprises a classification of the input. The computer-based automated method may be performed by executing instructions in at least one processor, and wherein said instructions are stored on a non-transitory memory readable by the at least one processor.

According to another aspect, a computer-based automated method of performing classification includes performing pre-training on a deep learning model to learn discriminate features through an Empirical Risk Minimization (ERM) problem based on minimizing cross entropy loss to thereby provide a pre-trained deep learning model. The method further includes optimizing an area under a receiver operating characteristic curve (AUC) score using a stochastic primal-dual method for the pre-trained deep learning model. The method further includes receiving an input into a deep neural network and processing the input to the deep neural network to generate a prediction, wherein the prediction comprises a classification of the input, The computer-based automated method may be performed by executing instructions in at least one processor, and wherein said instructions are stored on a non-transitory memory readable by the at least one processor. The classification may be a multi-task classification. The method may further include dropping a last layer of the pre-trained deep learning model and replacing with random initial weights prior to AUC optimization.

According to another aspect, a computer-based automated method of performing classification may include generating a deep learning model which provides for learning discriminate features through an Empirical Risk Minimization (ERM) problem based on minimizing cross entropy loss, optimizing an area under a receiver operating characteristic curve (AUC) score or a precision-recall curve (AUPRC) using a stochastic primal-dual method for the deep learning model, receiving an input into a deep neural network, and processing the input to the deep neural network to generate a prediction, wherein the prediction comprises a classification of the input. The computer-based automated method may be performed by executing instructions in at least one processor, and wherein said instructions are stored on a non-transitory memory readable by the at least one processor.

According to another aspect, a computer-based automated method of performing classification by stochastic optimization of averaged precision is provided. The method includes learning a deep neural network by maximizing an area under a precision-recall curve (AUPRC), receiving an input into the deep neural network, and processing the input to the deep neural network to generate a prediction, wherein the prediction comprises a classification of the input. The computer-based automated method may be performed by executing instructions in at least one processor, and wherein said instructions are stored on a non-transitory memory readable by the at least one processor

BRIEF DESCRIPTION OF THE DRAWINGS

Illustrated embodiments of the disclosure are described in detail below with reference to the attached drawing figures, which are incorporated by reference herein.

DETAILED DESCRIPTION

Figure 1:
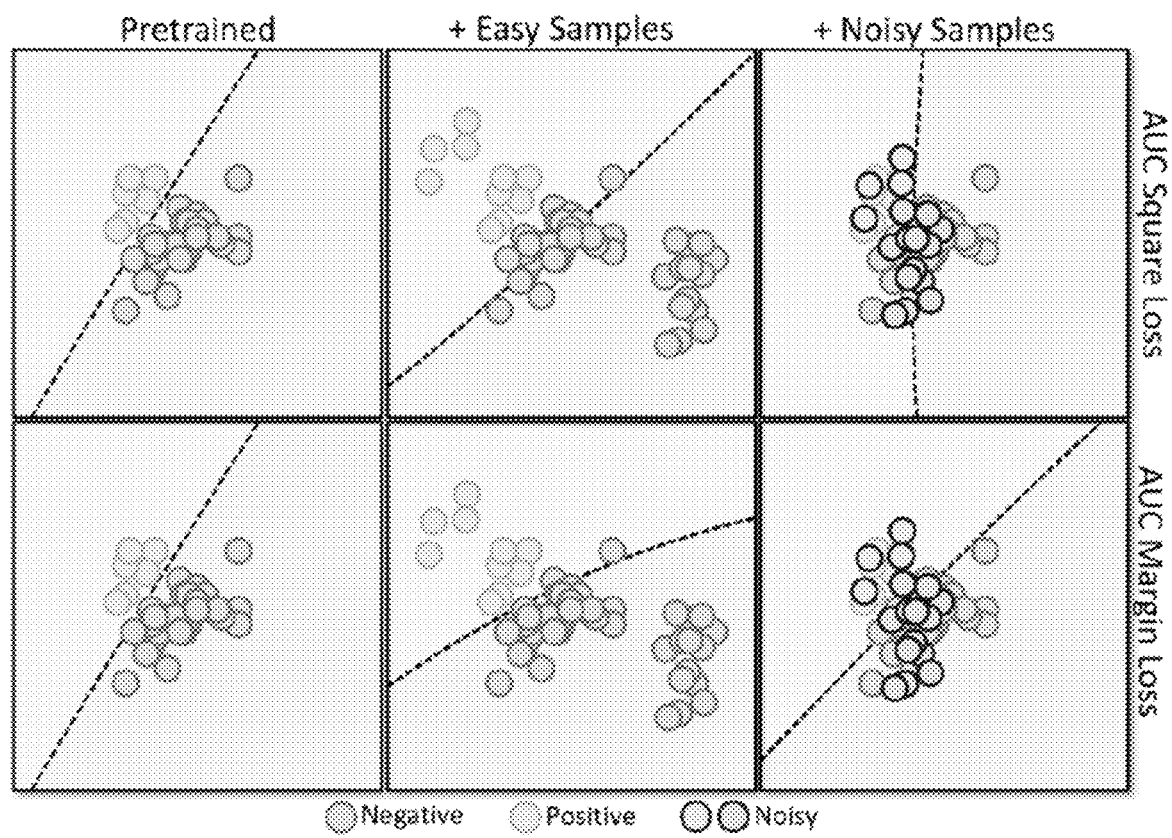
FIG. 1 is an illustrative example for optimizing different AUC losses on a toy data for learning a two-layer neural network with ELU activation. The top row is optimizing the AUC square loss and the bottom row is optimizing the new AUC margin loss. The first column depicts the decision boundary (dashed line) pretrained on a set of examples. In the middle column, we add some easy examples to the training set and retrain the model by optimizing the AUC loss. In the last column, we add some noisily labeled data (blue circled data) to the training set and retrain the model by optimizing the AUC loss. The results demonstrate the new AUC margin loss is more robust than the AUC square loss.

For purposes of describing the present invention, this description is dividing into Part I and Part II. Part I describes a robust deep AUC maximization: a new surrogate loss and empirical studies on medical image classification. Part II further describes stochastic optimization of areas under precision-recall curves with provable convergence.

Part I

1. Introduction

In the last decade, we have seen great progress in deep learning (DL) techniques for medical image classification driven by large-scale medical datasets. For example, Stanford machine learning group led by Professor Andrew Ng has collected and released a high-quality large-scale Chest X-Ray dataset for detecting chest and lung diseases, which contains 224,316 high-quality X-rays images from 65,240 patients. Various deep learning methods have been designed and evaluated on this dataset by participating the CheXpert competition organized by Stanford ML group [16], and many of them have achieved radiologist-level performance on detecting certain related diseases. Esteva et al. have trained a CNN using a dataset of 129,450 clinical images consisting of 2,032 different diseases, and achieved dermatologist-level performance for classification of skin lesions [6]. Wu et al. [29] has trained a deep neural network for breast cancer screening on a large-scale medical dataset, which includes 229,426 digital screening mammography exams (1,001,093 images) from 141,473 patients. Their model is as accurate as an experienced radiologist. Despite these great efforts, an important question remains: "Can we design a generic method that can further improve the performance of DL on these medical datasets without relying on domain knowledge"? In this disclosure, we provide an affirmative answer to this question. Our solution is to optimize a novel loss for DL instead of optimizing the standard cross-entropy loss in the previous works. In particular, we choose to maximize the AUC score (a.k.a area under the ROC curve) for DL. There are several benefits of maximizing AUC score over minimizing the cross-entropy loss. First, in medical classification tasks the AUC score is the default metric for evaluating and comparing different methods. Directly maximizing AUC score can potentially lead to the largest improvement in the model's performance. Second, the datasets in medical image classification tasks are usually imbalanced (e.g., the number of malignant cases is usually much less than benign cases). AUC is more suitable for handling imbalanced data distribution since maximizing AUC aims to rank the predication score of any positive data higher than any negative data. However, AUC maximization is much more challenging than minimizing mis-classification error since AUC is much more sensitive to model change. By changing the prediction scores of a few examples, the mis-classification error rate remains unchanged but the AUC score drops significantly.

AUC maximization has been studied in the community of machine learning [8, 31, 20, 17, 7]. However, existing methods for AUC maximization are still not satisfactory for practical use. The foremost challenge for AUC maximization is to determine a surrogate loss for the AUC score. A naive way is to use a pairwise surrogate loss based on the definition of the AUC score. However, optimizing a generic pairwise loss on training data suffers from a severe scalability issue, which makes it not practical for DL on large-scale datasets. Several studies have made attempts to address the scalability issue [17, 32, 31, 20]. One promising solution is to maximize the pairwise square loss for AUC by utilizing its special form [31, 20]. However, our study reveals that the AUC square loss has adverse effect when trained with easy data and is sensitive to the noisy data.

To address these issues, we propose a new margin-based surrogate loss for AUC. Our AUC margin loss is inspired by addressing the two issues of the AUC square loss. In particular, the AUC margin loss has two features that can alleviate the two issues, making it more robust to noisy data and not adversely affected by easy data. We will explain it with more details in the technical section and use a toy example in FIG. 1 to illustrate the robustness of AUC margin loss over AUC square loss. Moreover, our AUC margin loss enjoys the same benefit as the AUC square loss in terms of scalability, making it more attractive than conventional margin-based pairwise surrogate loss for AUC. In particular, we are able to directly employ existing large-scale optimization algorithms designed for maximizing the AUC square loss to maximize our AUC margin loss with one line change of the code. To demonstrate the effectiveness of our deep AUC maximization method, we conduct empirical studies on two difficult medical image classification tasks, namely classification of chest X-ray images and classification of images of skin lesions for identifying melanoma. Our deep AUC maximization method has achieved great success on these difficult tasks. Specifically, we achieved the 1st place on Stanford CheXpert competition at the time of filing, and Top 1% rank on Kaggle 2020 Melanoma classification competition. In CheXpert competition (launched in January, 2019), our method is ranked 1 out of 150+ submissions, with a testing AUC score of 0.9305 (on a private testing data). The second place that uses the domain knowledge on the relationship between different diseases has a testing AUC score of 0.9299 [24]. In the Kaggle competition (running from May, 2020 to August, 2020), our method is ranked 33 out of 3314 teams with a testing AUC score of 0.9438 (on a private testing data), and the winning team has a testing AUC score of 0.9490. We would like to mention that our result is an ensemble of 10 models, while the winner's result is an ensemble of 18 models. Besides these medical image classification tasks, we also conduct extensive ablation studies on benchmark datasets to compare the proposed AUC margin loss with the AUC square loss and traditional classification losses including cross-entropy and focal loss.

2. Related Work

Optimizing Pairwise Surrogate loss. Based on the definition of AUC, many studies consider to optimize a pairwise surrogate loss for AUC [8, 31, 20]. Joachims et al [17] proposed a SVM method for optimizing the AUC measure, which has a complexity of $O(n^2)$ for a dataset with n examples. Many later studies tried to improve the efficiency of optimizing a pairwise surrogate loss of AUC. Herschtal et al. [14] proposed an approximate objective for empirical pairwise loss of AUC by using partial pairs. In particular, for each negative data they only constructed a pairwise loss with only one positive data. However, the quality of such approximation highly depends on the properties of the dataset. When the examples have large intra-variance, their objective could yield poor performance. Zhao et al. [32] proposed an online method for AUC maximization by maintaining a data buffer for storing some historical positive and negative data, and constructed an approximate AUC score by pairing a newly received data with all data in the buffer. However, analysis shows that such data buffer needs to be very large in order to make the algorithm has a small regret.

Optimizing Pairwise Square loss. Pairwise square loss is an exception, which has a unique property to enable one design efficient stochastic algorithms for large-scale data. Gao et al. [7] proposed an online method that maintains and updates first-order and second-order statistics of the data for updating the model. Ying et al. [31] formulated the minimization of the pairwise square loss into an equivalent minmax optimization problem, which allows them to develop efficient stochastic algorithms without explicitly constructing and handling pairs of positive and negative data. Several papers tried to improve the convergence rate for solving the min-max optimization problems [21, 23]. Deep AUC Maximization. Most of the studies mentioned above are for learning a linear model. Recently, there are some emerging studies on deep AUC maximization. In [27], the authors considered AUC maximization for learning a deep neural network based on an online buffered gradient method proposed by [32], and applied it to classification of breast cancer based on imbalanced mammogram images. Nevertheless, the issue of this approach is that it cannot scale to large datasets as it requires a large buffer to store positive and negative samples at each iteration for computing an approximate AUC score. Hence, they only consider datasets with few thousand medical images. Recently, [20, 10] proposed efficient stochastic non-convex min-max optimization algorithms for deep AUC maximization by solving the corresponding min-max objective of the AUC square loss. Their algorithms can scale up to hundreds of thousands of training examples. Guo et al. [9] proposed a federated learning algorithm for distributed DAM. However, all of these studies have neglected the deficiencies of the square loss for AUC maximization. To the best of our knowledge, this is the first work that analyzes the deficiencies of the AUC square loss and proposes a solution to addressing its deficiencies.

3. Method

Notations. Let $\mathbb{I}(\cdot)$ be an indicator function of a predicate, $[s]_+=\max(s,0)$. Let $S=\{(x_1,y_1), \ldots, (x_n, y_n)\}$ denote a set of training data, where $x_i$ represents an input training example (e.g., an image), and $y_i \in \{1, -1\}$ denotes its corresponding label (e.g., the indicator of a certain disease). For notational simplicity, we use $z=(x, y)$. Let $w \in \mathbb{R}^d$ denote the parameters of the deep neural network to be learned, and let $h_w(x)=h(w, x)$ denote the prediction of the neural network on an input data x. The standard approach of deep learning is to define a loss function on individual data by $L(w; x, y)= \ell(h_w(x),y)$, where $\ell(\hat{y},y)$, is a surrogate loss function of the misclassification error (e.g., cross-entropy loss), and to minimize the empirical loss $$\min_{w\in\mathbb{R}^d} \frac{1}{n}\sum_{i=1}^n L(w; x_i, y_i).$$

However, this standard approach is easily misled by the imbalanced distribution of training images in medical datasets. In medical applications, a more favorable metric for comparing and evaluating different classifiers is AUC. It has been shown that the algorithms designed to minimize the misclassification error rate may not lead to maximization of AUC [3].

3.1 Background on Scalable AUC Maximization

Existing works on AUC maximization consider the following definition of AUC that is equivalent to the Wilcoxon-Mann-Whitney statistic [12, 2]:

$$AUC(w) = Pr(h_w(x) \geq h_w(x') \mid y = 1, y' = -1) = \qquad (1)$$

$$\mathbb{E}\left[\mathbb{1}\left(h_w(x) - h_w(x') \geq 0\right) \mid y = 1, y' = -1\right].$$

It is interpreted that the AUC score is the probability of a positive sample ranking higher than a negative sample. For optimization purpose, the indicator function in the above definition of AUC is usually replaced by a convex surrogate loss $\ell : \mathbb{R} \to \mathbb{R}^+$ which satisfies $\mathbb{1}(h_w(x)-h_w(x')<0) \leftarrow \ell(h_w(x)-h_w(x'))$. As a result, many existing works formulate AUC maximization as $$\min_{w \in \mathbb{R}^d} \mathbb{E}\left[\ell(h_w(x) - h_w(x'))\mathbb{1}_{[y=1]}\mathbb{1}_{[y'=1]}\right]. \qquad (2)$$

With a finite set of training data S, one usually minimizes an empirical version of above objective, i.e., $$\min_{w \in \mathbb{R}^d} \frac{1}{N_+ N_-} \sum_{x \in S_+} \sum_{x' \in S_-} \ell(h_w(x) - h_w(x')), \qquad (3)$$

where $S_+$, $S_-$ denote the set of positive and negative examples, and $N_+$, $N_-$ denote their size, respectively. Nonetheless, directly optimizing the above formulation is not scalable to large datasets as the complexity could be as worse as $O(n^2)$ due to there are $O(n^2)$ pairs, where n is the total number of examples.

To address the scalability issue, existing studies have proposed some promising solutions. One solution that attracts great attention is to optimize the square loss due to its algorithmic simplicity. With a square loss $\ell(h_w(x)-h_w(x'))=(1-h_w+h_w(x'))^2$ as the surrogate loss of AUC, it was shown that the objective in (2) is equivalent to the following min-max problem [31]:

$$\min_{\substack{w \in \mathbb{R}^d \\ (a,b) \in \mathbb{R}^2}} \min_{\alpha \in \mathbb{R}} f(w, a, b, \alpha) := \mathbb{E}_z[F(w, a, b, \alpha; z)], \qquad (4)$$

where $$F(w, a, b, \alpha, z) = (1-p)(h_w(x)-a)^2 \mathbb{1}_{[y=1]} + p(h_w(x)-b^2)\mathbb{1}_{[y=-1]} - \qquad (5)$$
$$p(1-p)\alpha^2 + 2\alpha\left(p(1-p) + ph_w(x)\mathbb{1}_{[y=-1]} - (1-p)h_w(x)\mathbb{1}_{[y=1]}\right),$$

And p=Pr(y=1). Since the objective function in the above formulation is decomposable over individual examples, hence it enables one to develop efficient primal-dual stochastic algorithms for updating the model parameter w without explicitly constructing positive-negative pairs. Several studies have developed efficient stochastic algorithms for solving the above min-max formulation, which are able to scale to hundreds of thousands of examples.

3.2 Drawbacks of the AUC Square Loss

Although the AUC square loss makes AUC maximization scalable, it has two issues that have been ignored by existing studies. In particular, it has adverse effect when trained with well-classified data (i.e., easy data), and is sensitive to noisily labeled data (i.e., noisy data). Below, we will elaborate these two issues by considering a linear model $h_w(x)=w^T x$ for illustration and understand these issues from the viewpoint of stochastic gradient update. When we use the min-max formulation (4) to explain these issues, we will make some simplification. In particular, we will use the optimal value of a, b, a given w, i.e., $a=a(w):=\mathbb{E}[h_w(x)|y=1]$, $b=b(w):=\mathbb{E}[h_w(x)|y=-1]$, $\alpha=1+b-a$, where a, b can interpreted as the mean prediction score on positive data and negative data, respectively. The same trick will be used to illustrate the benefit of the AUC Margin loss.

Adverse Effect on Easy Data. To illustrate this, let us consider a scenario: the current model parameter is given by w and there comes a positive and negative data pair (x,y=1), (x',y'=-1). Suppose these data are easy examples meaning that the prediction $h_w(x)$ is large and $h_w(x')$ is small such that $h_w(x)-h_w(x')>1$. By taking the stochastic gradient descent update of the square loss $\ell(h_w(x)-h_w(x'))=(1-h_w(x)+h_w(x'))^2$, we have the updated model given by $w_+=w- \eta 2(1-h_w(x)+h_w(x'))(-x+x')$, where $\eta>0$ is a step size. Sine $1-h_w(x)+h_w(x')<0$, model parameter w will move towards the negative direction of the positive data x and the positive direction of the negative data x'. As a result, the new model $w^+$ tends to push the score $h_{w+}(x)$ the positive data smaller and the score $h_{w+}(x')$ on the negative data larger, which makes its classification capability worse. A similar effect happens when we use the min-max objective (4) to conduct the update. The same effect appears when we optimize the min-max formulation. In particular, the gradient of F (w, a, b, α, z) is given by $\nabla_w F(w, a, b, \alpha, z)=2(1-p)x\mathbb{1}_{[y=1]}\cdot(h_w(x)-a-\alpha)+2px\mathbb{1}_{[y=-1]}\cdot(h_w(x)-b+\alpha)$. When z is positive, the first term above is active, by plugging the optimal value of a, b, α given w the stochastic gradient descent update will yields an updated model as $w_+=w-\eta 2(1-p)x\mathbb{1}_{[y=i]}\cdot(h_w(x)-1-b)$, where b is the mean prediction score on negative data. When x is an easy positive data such that $h_w(x)-1-b>0$, then $w_+$ will move towards the negative direction of the positive data x, as a result it will push the score $h_{w+}(x)$ on the positive data smaller than $h_w(x)$, which is harmful for AUC maximization. Similarly, we have the same phenomenon when the sampled data z is negative.

Sensitivity to Noisy Data. Next, we elaborate the issue of sensitivity to noisily labeled examples. To this end, we consider a scenario: the current model parameter is given by w and there comes a positive and negative data pair (x, y=1,ŷ=-1), x', y'=-1,ŷ'=1), where y, y' denote the true label x, x' respectively and ŷ=-1,ŷ'=1 denote the noisy labels. Again, assume the prediction $h_w(x)$ is large and $h_w(x')$ is small. The SGD update of the model parameter w based on the min-max objective is given by $w_+=w-2\eta\{(1-p)(h_w(x')-a-\alpha)x'+p(h_w(x)-b+a)x\}$. By plugging the optimal values of a, b given w, i.e., $\alpha=1+b-a$ and $\alpha=\mathbb{E}[h_w(x)|y=1]$, $b=\mathbb{E}[h_w(x')|y=-1]$, we can see that the term in the update of w that involves x is $-2\eta p(h_w(x)+1-\mathbb{E}[h_w(x)|y=1])x$, and that involves x' is $-2\eta p(h_w(x')-1-\mathbb{E}[h_w(x')|y'=1])x'$. Then it is clear to see that when $h_w(x)$ is large enough such that $h_w(x)+1-[h_w(x)|y=1]>0$, the update of w will move to the negative direction of the truly positive data x, and similarly it will move to the positive direction of the truly negative data x' when $h_w(x')$ is small enough.

3.3. The Proposed AUC Margin Loss

To alleviate the two issues of the AUC square loss, we propose a new margin-based surrogate loss. The new surrogate loss is a direct modification of the square loss to alleviate the two issues. To motivate the new AUC margin loss, we reformulate the AUC square loss as follows:

$$A_x(w) = \mathbb{E}[(1 - h_w(x) + h_w(x'))^2 \mid y = 1, y' = -1] = \quad (6)$$

$$\mathbb{E}[(h_w(x) - \underbrace{a(w)}_{A_1(w)})^2 \mid y = 1] + \mathbb{E}[(h_w(x) - \underbrace{a(w)}_{A_2(w)})^2 \mid y' = 1] +$$

$$(1 - \underbrace{a(w) + b(w)}_{A_3(w)})^2 = A_1(w) + A_2(w) + \max_\alpha \{2\alpha(1 - a(w) + b(w)) - \alpha^2\},$$

where $a(w)=\mathbb{E}[h_w(x)|y=1]$, $b(w)=\mathbb{E}[h_w(x')|y'=1]$, and in the second equality we use the fact $s^2=\max_\alpha 2\alpha s-\alpha^2$. The three terms $A_1(w)$, $A_2(w)$, $A_3(w)$ have meaningful interpretations. In particular, minimizing $A_1(w)$, $A_2(w)$ aim to minimize the variance of prediction scores on positive data and negative data, respectively; minimizing the $A_3(w)$ aims to push the mean prediction scores of positive and negative examples to be far away. However, the square function in the last term makes it suffer from the two aforementioned issues. Our solution is to use a squared hinge function to replace $A_3(w)$, which is widely used in margin-based SVM classifiers. In particular, we replace $A_3(w)$ by $\max_{\alpha>0}\{2\alpha(m-a(w)+b(w))-\alpha^2\}=(m-a(w)+b(w))_+^2$, where m is a hyperparameter that specifies desired margin between $a(w)$ and $b(w)$. Hence, our new AUC margin loss is defined by $$A_M(w) = A_1(w) + A_2(w) + \max_{\alpha \geq 0} 2\alpha(m - a(w) + b(w)) - \alpha^2. \quad (7)$$

Without the non-negative constraint on, the loss becomes the square loss with a tunable margin parameter m.

Benefits of the AUC Margin Loss. We first show that the above objective is equivalent to a min-max objective. Theorem 1. Minimizing the AUC margin loss (7) is equivalent to the following min-max optimization:

$$\min_{\substack{w \in \mathbb{R}^d \\ (a,b) \in \mathbb{R}^2}} \min_{\alpha \geq 0} \mathbb{E}_z[F_M(w, a, b, \alpha; z)], \quad (8)$$

where $$F_M(w, a, b, \alpha, z) = (1-p)(h_w(x) - a)^2 \mathbb{1}_{[y=1]} + p(h_w(x) - b)^2 \mathbb{1}_{[y=-1]} - \quad (9)$$

$$p(1-p)\alpha^2 + 2\alpha\Big(p(1-p)m + ph_w(x)\mathbb{1}_{[y=1]} - (1-p)h_w(x)\mathbb{1}_{[y=1]}\Big).$$

Robust to Easy Data. Based on the above min-max formulation, let us first elaborate the benefits of the new loss that alleviate the two issues of the AUC square loss. First, let us consider how the non-negative constraint $\alpha>0$ help alleviate the adverse effect when trained with easy data. Following the same logic as before, we compute the gradient of $F_M(w, a, b, \alpha; z)$ by $\nabla_w F_M(w, a, b, \alpha; z)=2(1-p)x\mathbb{1}_{[y=1]} \cdot (h_w(x)-a-\alpha)+2px\mathbb{1}_{[y=-1]} \cdot (h_w(x)-b+\alpha)$. Different from the square loss, the optimal $\alpha$ given w is $\alpha=m+b(w)-a(w)$ if $m+b(w)-a(w)\geq 0$, and $\alpha=0$ if $m+b(w)-a(w)<0$, where $\alpha(w)=\mathbb{E}[h_w(x)|y=1]$, $b(w)=\mathbb{E}[h_w(x)|y=-1]$. When the model is good enough, i.e., $m+b(w)-a(w)<0$ meaning that the mean prediction scores of positive data is larger than the mean prediction scores of negative data by a margin m>0, then the gradient becomes $\nabla_w F_M(w, a, b, \alpha; z)=2(1-p)x\mathbb{1}_{[y=-1]} \cdot (h_w(x)-a)+2px\mathbb{1}_{[y=-1]}-(h_w(x)-b)$. Taking a stochastic gradient decent update for w will only push the prediction score of the sampled data to be close to their mean score. When the model is poor, i.e., $m+b(w)-a(w)\geq 0$, the gradient becomes $\nabla_w F_M(w, a, b, \alpha; z)=2(1-p)x\mathbb{1}_{[y=1]}-(h_w(x)-m-b(w))+2px\mathbb{1}_{[y=-1]} \cdot (h_w(x)+m-a(w))$. Since the model is poor in this case, it is likely that $h_w(x)+m-b(w)<0$ for a positive data x, $h_w(x)+m-a(w)>0$ for a negative data x. As a result, taking a stochastic gradient decent update for $w_+=w-\eta\nabla F_M(w, a, b, \alpha; z)$ will likely move the model in the right direction pushing the prediction score of positive data larger, and that of negative data smaller.

Robust to Noisy Data. Next, let us elaborate how adding a tunable margin parameter m cane help alleviate the sensitivity to noisy data. Similar to the AUC square loss, the update in the noisy data case is given by $w_+=w-2\eta\{(1-p)(h_w(x')-a-\alpha)x'+p(h_w(x)-b+\alpha)x\}$, where x' is a true negative data but labeled as positive and x is a true positive data and labeled as negative. Let us consider the case that model is not good enough such that the optimal value of $\alpha=m+b(w)-a(w)$. Then the term in the update of w that involves the true positive data x is $-2\eta p(h_w(x)+m-\mathbb{E}[h_w(x)|y=1])x$, and that involves the true negative data x' is $2\eta p(m+\mathbb{E}[h_w(x')|y'=1]-h_w(x'))x'$. Note that even when $h_w(x)$ is larger and $h_w(x')$ is small such that the model $w_+$ is moving in the wrong direction, by tuning m to a smaller value, we can ensure that the movement into the wrong

| Algorithm 1 PESG for solving AUC margin loss |
|---|
| Require: $\eta$, $\gamma$, $\lambda$, T |
| 1:     Initialize $v_1$, $\alpha_1 \geq 0$ |
| 2:     for t = 1, ... , T do |
| 3:     Compute $\nabla_v F_M(v_t, \alpha_t, z_t)$ and $\nabla_\alpha F_M(v_t, \alpha_t, z_t)$. |
| 4:     Update primal variables |
|         $v_{t+1} = v_t - \eta(\nabla_v F_M(v_t, \alpha_t, z_t) + \gamma(v_t - v_{ref})) - \lambda\eta v_t$ |
| 5:     Update $\alpha_{t+1} = [\alpha + \eta\nabla_\alpha F_M(v_t, \alpha_t, z_t)]_+$. |
| 6:     Decrease $\eta$ by a factor and update $v_{ref}$ periodically. |
| 7:     end for | direction is much reduced. Hence, adding the tunable margin parameter m can alleviate the sensitivity to the noisy data.

3.4 Optimizing the AUC Margin Loss

As seen from Theorem 1, the AUC margin loss is equivalent to a min-max optimization problem, that is similar to that of the AUC square loss. Hence, any stochastic algorithms proposed for solving the min-max objective of the AUC square loss can be easily adapted to solving the minmax objective of the AUC margin loss. In particular, for any update on the dual variable a, we follow by a projection step that project a into non-negative orthant. In this disclosure, we employ the proximal epoch stochastic method (named PESG) proposed in [10] to update variables w, a, b, $\alpha$. To present the algorithm, we use a notation v=(w, a, b) to denote all primal variables. The key steps are presented in Algorithm 1. In the algorithm, $\lambda$ denotes the standard regularization parameter (i.e. weight decay parameter), $\gamma>0$ is an algorithmic regularization parameter that can help improve the generalization, $v_{ref}$ is a reference solution that is updated periodically by using the accumulated average of $v_t$ in the previous stage (before decaying learning rate). We refer the readers to [20, 10] for more discussion and convergence analysis of this algorithm.

Figure 4:
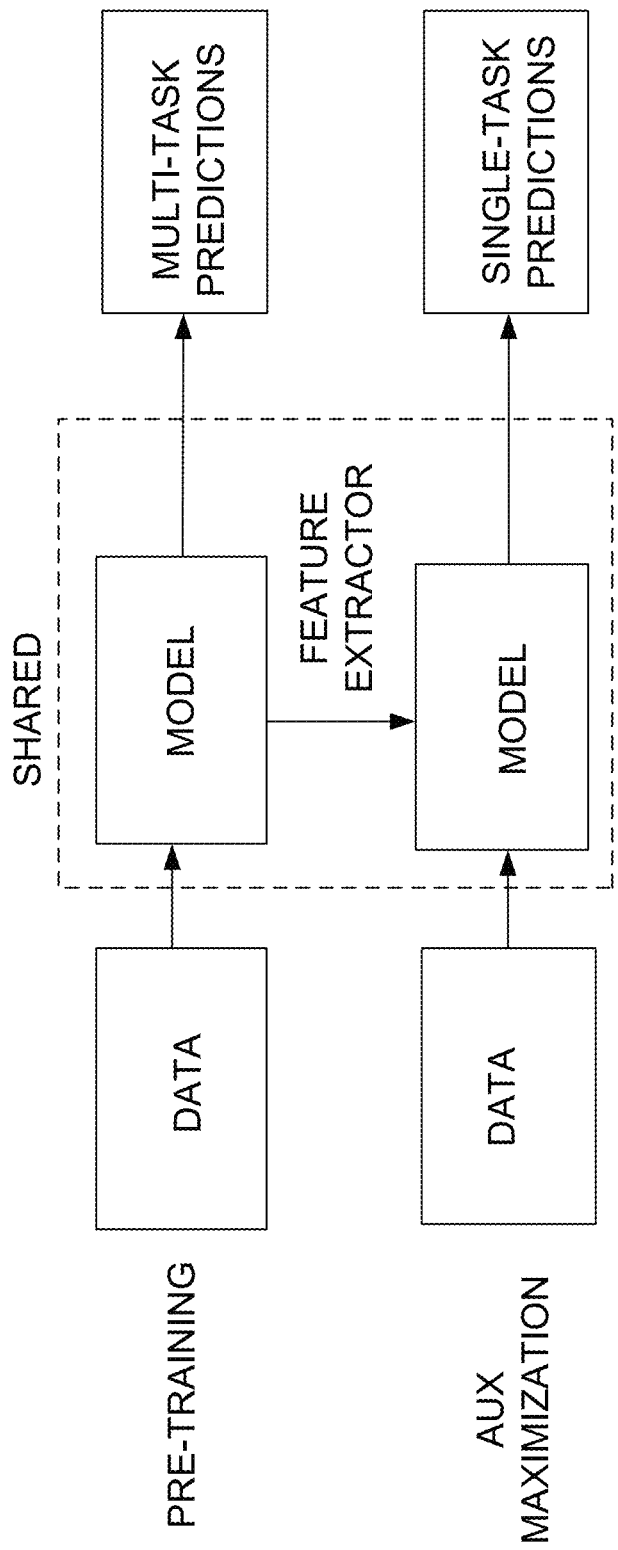
FIG. 4 illustrates one example of a two-step procedure.
Figure 5:
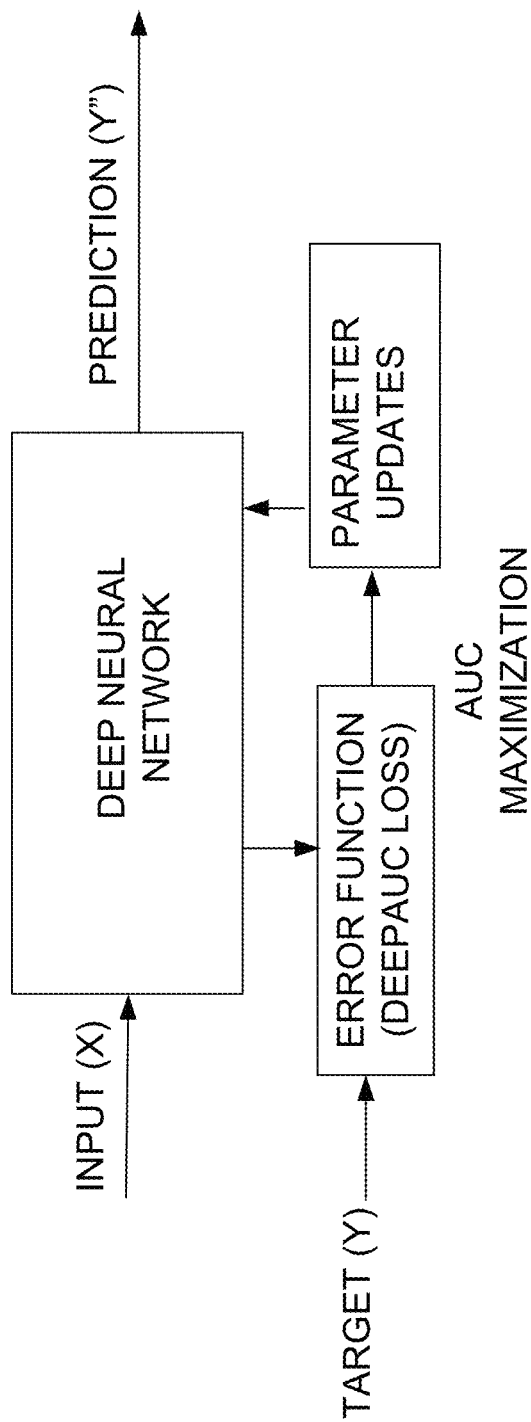
FIG. 5 illustrates one example of a deep system.

A Two-stage Framework for DAM. From our preliminary studies on deep AUC maximization, we observe that directly optimizing the AUC margin loss can easily handle the recognition tasks on simple datasets, e.g., CIFAR. However, it shows some difficulties on complex tasks, e.g., CheXpert, Melanoma. We conjecture that the feature extraction layers learned by directly optimizing AUC from scratch is not as good as optimizing the standard cross-entropy loss on these difficult data. Inspired by recent works on two-stage methods, e.g., [18], we also employ a two-stage framework on difficult medical image classification tasks that includes a pre-training step that minimizes the standard cross-entropy loss, and an AUC maximization step that maximizes the AUC surrogate loss of the pre-trained DNN with the last classifier layer replaced by a random initialization. FIG. 4 illustrates a diagram of a two-stage framework. Which includes a pre-straining step and an AUC maximization step. Warmup is an important step on deep learning models with large number of parameters on complex task, e.g., medical images, while it is optional on simple tasks, e.g., CIFAR and MNIST. Specifically, this step conducts on a multi-task classification (better than single task) in order to learn discriminate features through a standard ERM optimization problem based on minimizing cross entropy loss. The optimization method can be used by any popular optimizer deployed in existing learning frameworks, e.g., Tensorflow, Pytorch. However, Adam and SGD are recommended. To prevent the model overfitting on training data, early stopping is adopted. From the empirical studies on CheXpert and Melanoma datasets, an estimated training time for this step is about 20%~50% of total training time. Then in a second step, fine-tuning by AUC maximization is performed. For the pretrained model transferred from previous stage, the final classifier e.g., the last layer of deep neural network, is dropped and replaced by random initial weights. Bias term is optional. The classifier layer together with all other layers are fine-tuned by optimizing the AUC formulation presented in Section 2 with a stochastic primal-dual method. In addition, the learning parameters $\eta_t$, $\gamma$ is subject to change on different tasks. The deep system of this stage is illustrated in FIG. 5.

TABLE 1

Testing AUC on benchmark datasets with DenseNet121.

| (imratio) | CE | Focal | AUC-S | AUC-M |
|---|---|---|---|---|
| C2 (1%) | 0.718 ± 0.018 | 0.713 ± 1.009 | 0.803 ± 0.018 | 0.809 ± 0.016 |
| C10 (1%) | 0.698 ± 0.017 | 0.700 ± 0.007 | 0.745 ± 0.010 | 0.760 ± 0.006 |
| S10 (1%) | 0.641 ± 0.032 | 0.660 ± 0.027 | 0.669 ± 0.070 | 0.703 ± 0.030 |
| C100 (1%) | 0.588 ± 0.011 | 0.591 ± 0.017 | 0.607 ± 0.010 | 0.614 ± 0.016 |
| C2 (10%) | 0.893 ± 0.004 | 0.879 ± 0.005 | 0.910 ± 0.002 | 0.902 ± 0.001 |
| C10 (10%) | 0.898 ± 0.005 | 0.879 ± 0.005 | 0.889 ± 0.002 | 0.887 ± 0.005 |
| S10 (10%) | 0.820 ± 0.015 | 0.819 ± 0.010 | 0.825 ± 0.013 | 0.846 ± 0.015 |
| C100 (10%) | 0.710 ± 0.007 | 0.705 ± 0.007 | 0.720 ± 0.003 | 0.723 ± 0.006 |

4. Empirical Studies

In this section, we present extensive empirical studies on the proposed robust DAM method with the AUC margin loss. First, we present results on some benchmark datasets and then we present the results on two medical image classification tasks. For benchmark datasets, we construct imbalanced Cat&Dog (C2) [5], CIFAR-10 (C10), CIFAR-100 (C100), STL-10 (S10). We follow the instructions by [20] to construct the imbalanced sets for C2, C10, C100, S10. Specifically, we first randomly split the training data by class ID into two even portions as the positive and negative classes, and then we randomly remove some samples from the positive class to make it imbalanced. We keep the testing set untouched. We refer to imbalance ratio (imratio) as the ratio of #of positive examples to the #of negative examples. For medical image datasets CheXpert and Melanoma, we later provide additional details. Below, we use DataName (imratio) to denote a dataset with a certain imbalanced ratio, and also add a suffix "IB" to DataName denote its imbalanced version.

4.1. Performance on Benchmark Datasets

We experiment with two network structures, i.e., DenseNet121 ([15]) and ResNet20 ([13]) with ELU activation functions. We explore the imbalance ratio=1%, 10%. We use a 9:1 train/val split to conduct cross-valuation for tuning parameters. We compare DAM using our AUC margin loss (AUC-M) with four baselines, DAM using AUC square loss (AUC-S), and DL with two other popular loss functions i.e., cross-entropy loss (CE) and focal loss (Focal) trained by Adam. We use the $\hat{\alpha}$-balanced Focal loss $-\hat{\alpha}(1-p_t)^{\hat{\gamma}} \log(p_t)$, and tune its parameter $\hat{\alpha}, \hat{\gamma}$ from [0.25, 0.5, 0.75] and [1,2,5] on the validation set, respectively. For DAM, we tune $\gamma$ in [100, 300, 500, 700, 1000]. For AUCM loss, we tune margin parameter m in [0.1, 0.3, 0.5, 0.7, 1.0]. For optimization, we run 100 epochs with a stagewise learning rate: initial value of 0.1 and decaying at 50% and 75% of the total number of training epochs for all algorithms. We use a weight decay, i.e., $\lambda$, as 1e-4 for all methods. The batch size is set to 128 on all datasets except for S10, which is set to 32 due to smaller data size. Finally, we run each configuration with five different random training sets (by randomly removing some positive examples with different random seeds), and evaluate on the same testing set by comparing the averaged testing AUC scores. The results for DenseNet121 are reported in Table 1. Overall, we observe that the AUC-M and AUC-S perform much better than non-AUC-based loss in most configurations. Comparing AUC-M with AUC-S, we can see that AUC-M performs better in most cases, especially in the extremely imbalanced setting with imratio=1%.

4.2. Performance on Melanoma Classification

Melanoma is a skin cancer, which is the major cause for skin cancer death [22]. We conduct empirical studies on the Kaggle Melanoma dataset [25], which is released through a Kaggle competition. The data is split into 33,126 training images with 584 malignant melanoma images (imbalance ratio=1.76%) and 10,892 testing images with an unknown number of melanoma images. Further, the testing set is split into public testing set and private testing set at 30%/70% ratio by patient ID. The public testing set (noting that their ground-truth labels are not revealed) is used to rank participating teams at the early stage. The private testing set is used to evaluate the participating teams for the final ranking. The public AUC score is updated daily but private AUC score is released after the end of competition.

Data preparations. The raw dataset has various sizes of images, e.g., 6000×4000, 1920×1080. We resize all images to lower resolutions due to limited computational resources. To evaluate the model locally, we follow [4] to construct a 5-fold Stratified Leak-Free version cross-validation by 8:2 train/valid split. The data split follows two rules: 1) images from same patients are either put in train set or in validation set. 2) train and validation set have same imbalance ratio 1.76%. In addition, we also utilize two external data sources to complement the provided data: 1) 12,859 images from previous competitions, e.g., ISIC2017 and ISIC2018, and 2) 580 malignant melanoma images parsed from the website of The International Skin Imaging Collaboration [1]. We merge all data sources and finally obtain a training set of 46,131 images with an imbalance ratio of 7.1%. We want to emphasize that these external data sources are also used by other participating teams since it was advertised on the Kaggle forum by other teams.

Comparison with Baselines. We first compare with three baselines as above, i.e., optimizing CE, Focal and AUC-S losses. We choose the family of EffecientNet-B5 [28] as the main network. Data augmentations is very crucial in this competition, and we use a set of augmentations, e.g., horizontal flipping, rotating, scaling, shearing, coarse dropout following a public notebook [4]. In addition, we use the cyclical learning rate with a base learning rate [26] of 3e-5 and maximum learning rate of 2.4e-4 and with 8 epochs for a full cycle. We use a weight decay of 1e-5. For focal loss [19], we tune $\hat{\gamma}=\{1,2,5\}, \hat{\alpha}=\{0.25, 0.5, 0.75\}$ and report the best result. For all experiments, we train a total of 16 epochs with batch size of 256. For DAM, we start optimization from the pretrained backbone trained by optimizing the CE loss. For AUC losses, we set $\gamma$ to 500 which is tuned by cross validation. For AUC Margin loss, we also tune m=\{0.3,0.5, 0.7,1.0\}. For all experiments, we train 35 epochs in total with initial learning rate of 0.01 deceasing by 10 times every 10 epochs using Algorithm 1. In addition, we find patient-level contextual information (metadata) useful, e.g., age, sex, and location. To utilize metadata, after training EfficientNet, we merge it with a 2-layer neural network (2-NN, 256×128) with a 0.5:0.5 weighted ratio, which is fin-tuned independently.

Figure 2A:
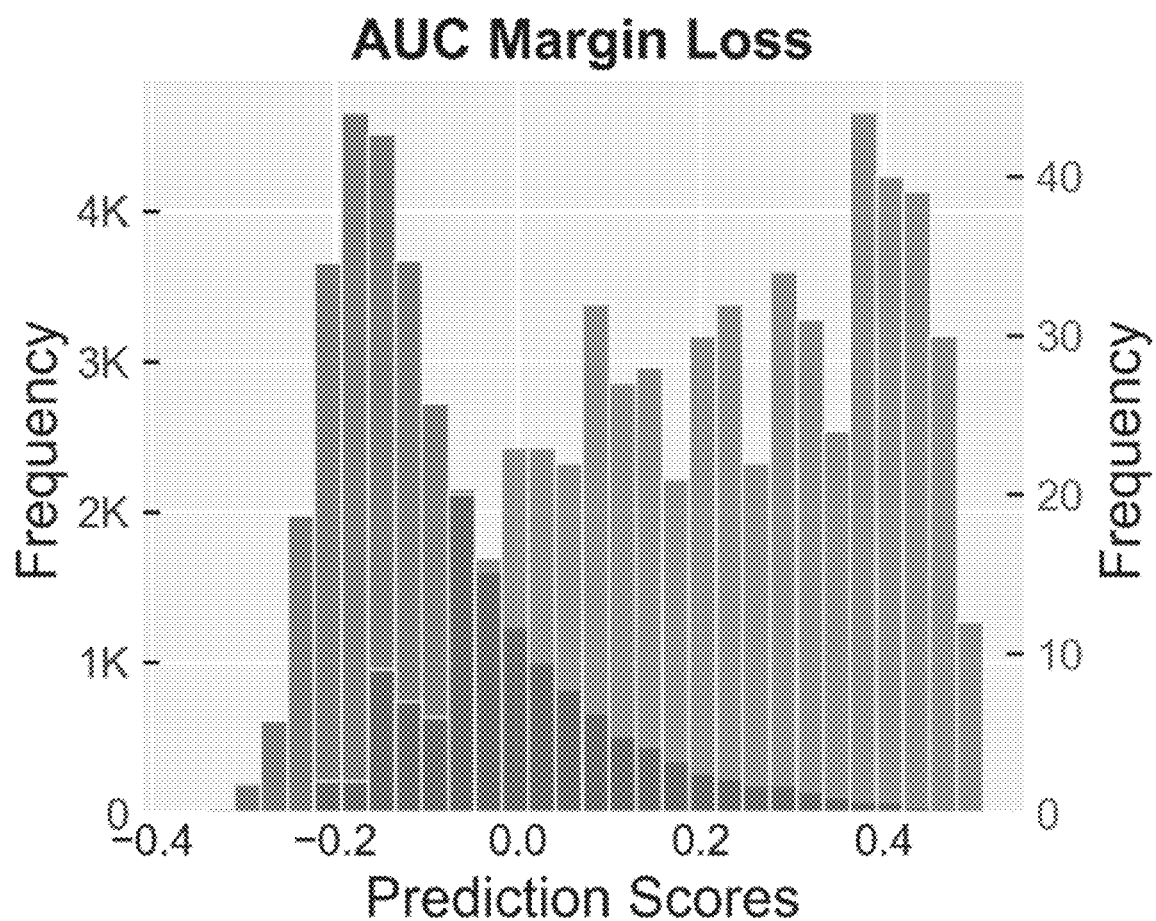
FIG. 2A and FIG. 2B provide a prediction histogram of positive and negative samples for the models trained by AUC-M loss and CE loss on Melanoma training dataset.
Figure 2B:
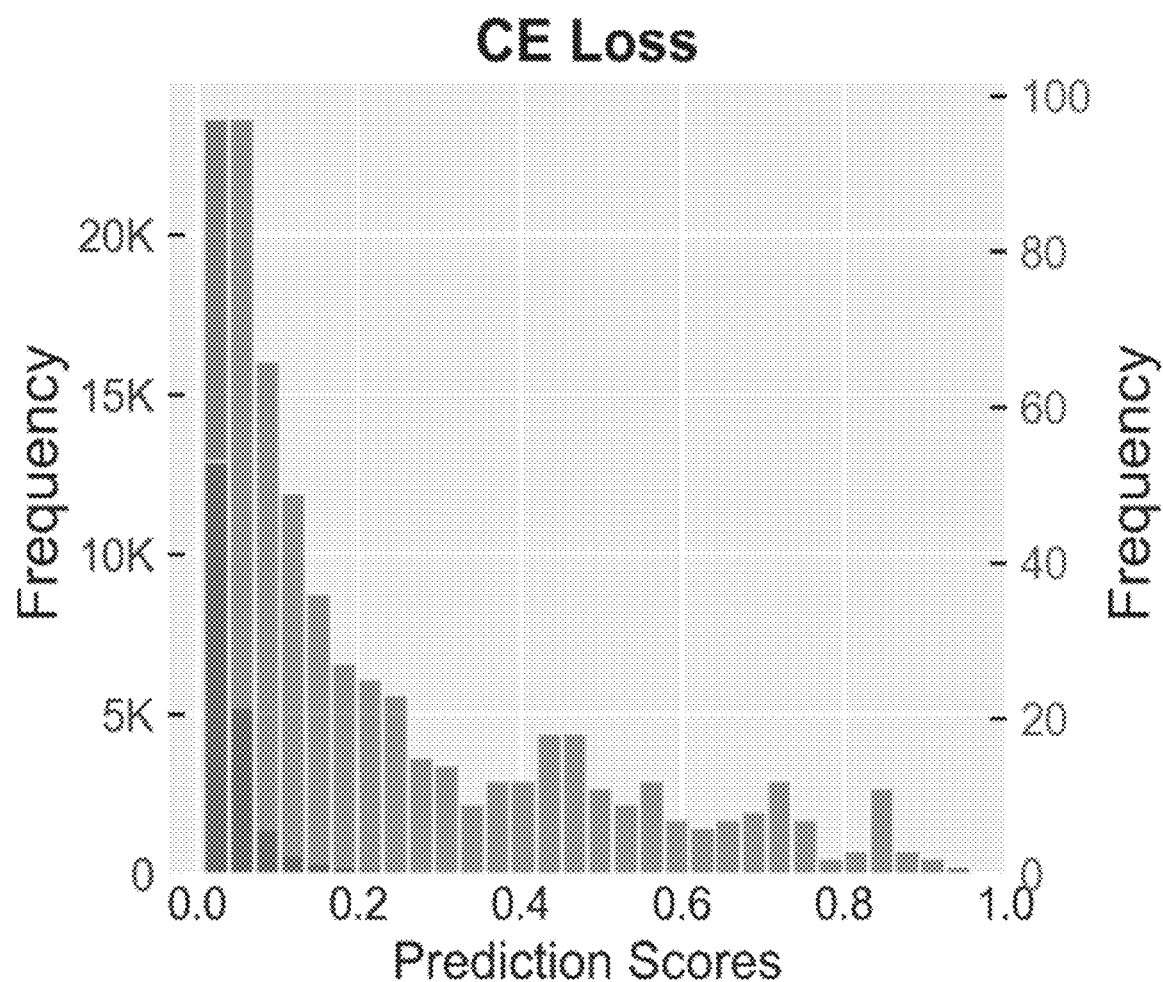

The comparison between different methods for learning EffecientNet-B5 on resized images with a fixed resolution of 384×384 is given in Table 2. For each method, we report four numbers that represent performance on the public testing data (in early stage of competition) and private testing data (for final ranking) with/without test-time data augmentation (TTA). We can see that DAM methods improve over the standard DL methods for minimizing CE and Focal losses. In addition, the AUC Margin loss is better than AUC Square loss. We also plot the histogram of predictions on training data of our DAM method compared with standard DL method with CE loss in FIG. 2A and FIG. 2B. We can see that the predictions made by the DAM method have two well-separated modes corresponding to positive and negative data. In contrast, the predictions made by optimizing the CE loss is more mixed together.

TABLE 2

Comparison of Testing AUC on Melanoma dataset for Optimizing EffecientNetB5. TTA(3) means that the results are averaged over 30 times of evaluation on different test-time augmented data.

| | wo/TTA | | w/TTA(30) | |
|---|---|---|---|---|
| Loss | Public | Private | Public | Private |
| CE | 0.9391 | 0.9285 | 0.9447 | 0.9345 |
| Focal | 0.9412 | 0.9266 | 0.9424 | 0.9303 |
| AUC-S | 0.9482 | 0.9332 | 0.9502 | 0.9364 |
| AUC-M | 0.9492 | 0.9357 | 0.9503 | 0.9393 |
| AUC-S(Meta) | 0.9495 | 0.9358 | 0.9501 | 0.9409 |
| AUC-M(Meta) | 0.9522 | 0.9380 | 0.9520 | 0.9423 |
| Our Submission | — | — | 0.9685 | 0.9438 |

Competition Results. For final submission towards this competition, we use an ensemble method. We train different nets including EffecientNet (B3, B5, B6) and different resolutions, i.e., 256×256, 384×384, 512×512, 768×768. Our final result is averaged over 10 models, which is also reported in 2. Our method achieves AUC scores of 0.9685/ 0.9438 on public/private sets, which rank at 42nd/33rd out of 3314 teams. To our best knowledge, this is also the first solution to optimize AUC in the competition. The winning team has an AUC score of 0.9490 on the private testing set [11]. We would like to emphasize that the winning team has used several useful tricks to improve the final result. In particular, they used an ensemble of 18 models and also used images at higher resolution of 896×896. We expect these tricks can be also used for improving our results. In terms of learning a single model, our DAM method has a higher AUC score of 0.9423 than their single model's AUC score of 0.9167 (their model 7 under similar configurations, e.g., EffecientNetB5, 384-resolution with metadata [11]).

4.3. CheXpert Competition

CheXpert is a large-scale Chest X-Ray dataset for chest and lung diseases [16]. The training data consists of 224,316 high-quality X-ray images from 65,240 patients. The validation dataset consists of 234 images from 200 patients. The testing data has images for 500 patients, which is not released to the public and is maintained by the organizer for evaluating each competing team. The training images were annotated by a labeler to automatically detect the presence of 14 observations in radiology reports, capturing uncertainties inherent in radiograph interpretation. The validation images were manually annotated by 3 board certified radiologists. The testing images were annotated by a consensus of 5 board-certified radiologists. The average resolution of CheXpert images is 2828×2320 pixels, which about 5~6 times than ImageNet. The competition requires participants to submit the trained models for evaluation of the AUC score on predicting 5 selected diseases, i.e., Cardiomegaly, Edema, Consolidation, Atelectasis, Pleural Effusion. They also reported another metric that compares the model's performance with 3 radiologists' predictions for reference.

Model Pre-training. To tackle the uncertain data in CheXpert, we adopt a label smoothing method similar to that in works [24]. We choose five networks: DenseNet121, DenseNet161, DensNet169, DensNet201 and Inception-renset-v2. With limited resources, we scale the resolution of all raw images to 320×320. For data augmentation, we use random rotation, random translation and random scaling. For pre-training step, we optimize CE loss by Adam on the 5 classification tasks with weight decay parameter of 1e-5. The total training time is 2 epochs with a batch size of 32 and initial leaning rate of 1e-5. In the second step of AUC maximization, we replace the last classifier layer trained in the first step by random weights and use our DAM method to optimize the last classifier layer and all previous layers.

We tune γ in {300, 500, 800}, set λ, to 0, set the initial learning rate to 0.1 and decay learning rate at 2000, 8000 iterations, run a total of 2 epochs for Algorithm 1.

TABLE 3

Averaged Testing AUC Scores on CheXpert.
NBRC means the # of radiologists ou of 3
are beaten by AI algorithms.

| Model | AUC | NRBC | Rank |
|---|---|---|---|
| Stanford Baseline [16] | 0.9065 | 1.8 | 85 |
| YWW [30] | 0.9289 | 2.8 | 5 |
| Hierarchical Learning [24] | 0.9299 | 2.6 | 2 |
| DAM (Ours) | 0.9305 | 2.8 | 1 |

Competition Results. Our final submission is the ensemble of five models trained by DAM with the margin loss for each disease. On Aug. 31, 2020, we submitted our models to CheXpert and we achieved a mean testing AUC score of 0.9305, which is currently ranked at 1st place over all submissions. The leaderboard is shown at (https://stanfordmlgroup.github.io/competitions/chexpert/), where our submission is named as SuperSCNN. We also compare our results with other methods in Table 3, where Hierarchical Learning [24] utilizes domain knowledge to pre-define a disease hierarchy used for conditional training, YWW [30] utilizes weakly-supervised lesion localization technique through a novel Probabilistic-CAM (PCAM) pooling operator to improve the model training. All these solutions are trained by CE loss. Our AUC-based solution surpasses these solutions and it is also better than 2.8 out of 3 radiologists for 5 selected diseases on average reported in the last column of Table 3. Finally, we noticed that a recent work that optimizes the AUC square loss for DAM only achieves mean testing AUC score of 0.922 [10].

5. Ablation Studies

Robustness to Noisy Data and Easy Data. We conduct ablation studies on the C2-IB data. To verify the robustness of our AUC loss to noisy data, we manually create some data with noisy labels. We construct the noisy dataset by modifying the C2 (imratio=1%). To this end, we sample 1% and 5% from negative class to flip their labels to positive, and also randomly sample 1% and 5% positive data from the deleted positive examples and flip their labels and add them to the training data. This gives us two datasets with 1% and 5% noisy ratio. To verify the robustness of our AUC loss to easy data, we first pre-train a model by minimizing CE loss on C2 (imratio=1%) and then we make predictions on the removed positive samples and sort all prediction scores in descending order. Finally, we choose top 10%, 20% of sorted samples and add them to training set. We train DenseNet121 using batch size of 128 and initial learning rate of 0.1. Other parameter settings are the same as in Section 4.1. We run experiments 5 times and plot the average testing AUC curve in FIGS. 3A-3D for the setting with 1% noisy data and 10% easy data. In Appendix, we report results on other settings. All results clearly show that AUC-M outperforms AUC-S by a large margin.

Figure 3A:
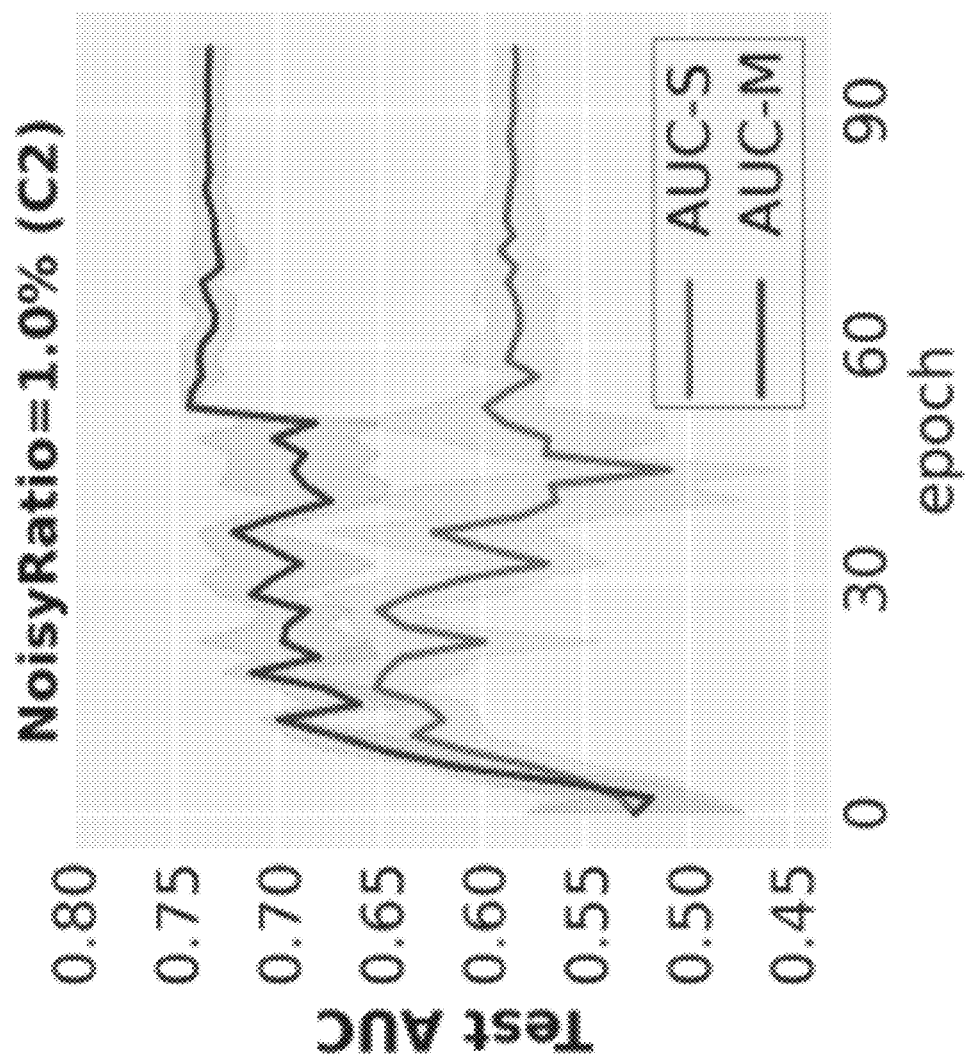
FIG. 3A, FIG. 3B, FIG. 3C, and FIG. 3D illustrate a top row: comparison when adding noisy and easy samples (FIGS. 3A and 3B) and a bottom row: comparison between with/without $\alpha \geq 0$ (FIG. 3C and FIG. 3D).
Figure 3B:
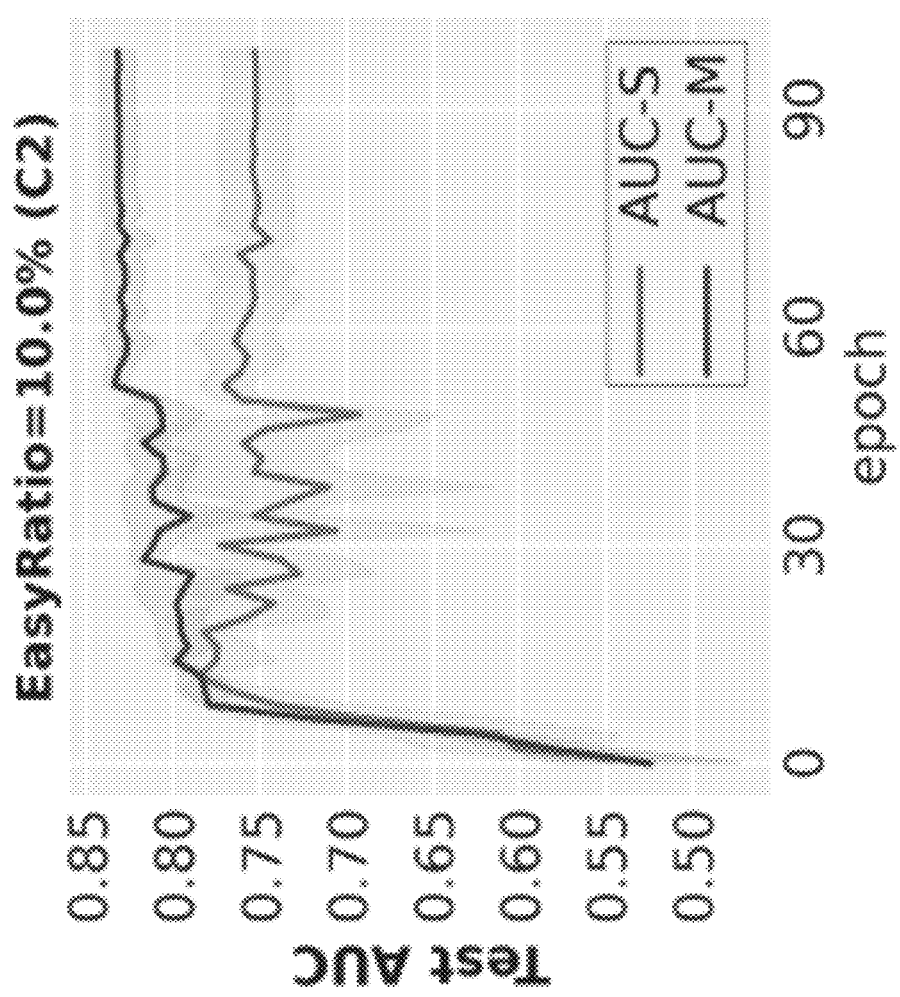
Figure 3C:
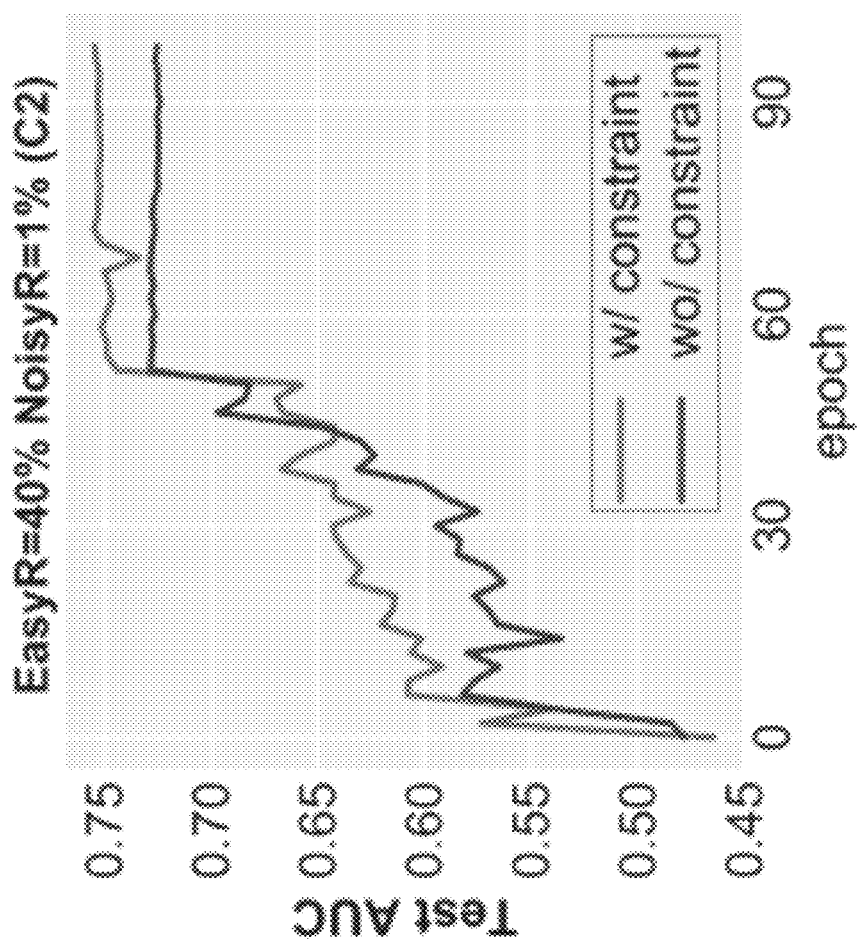
Figure 3D:
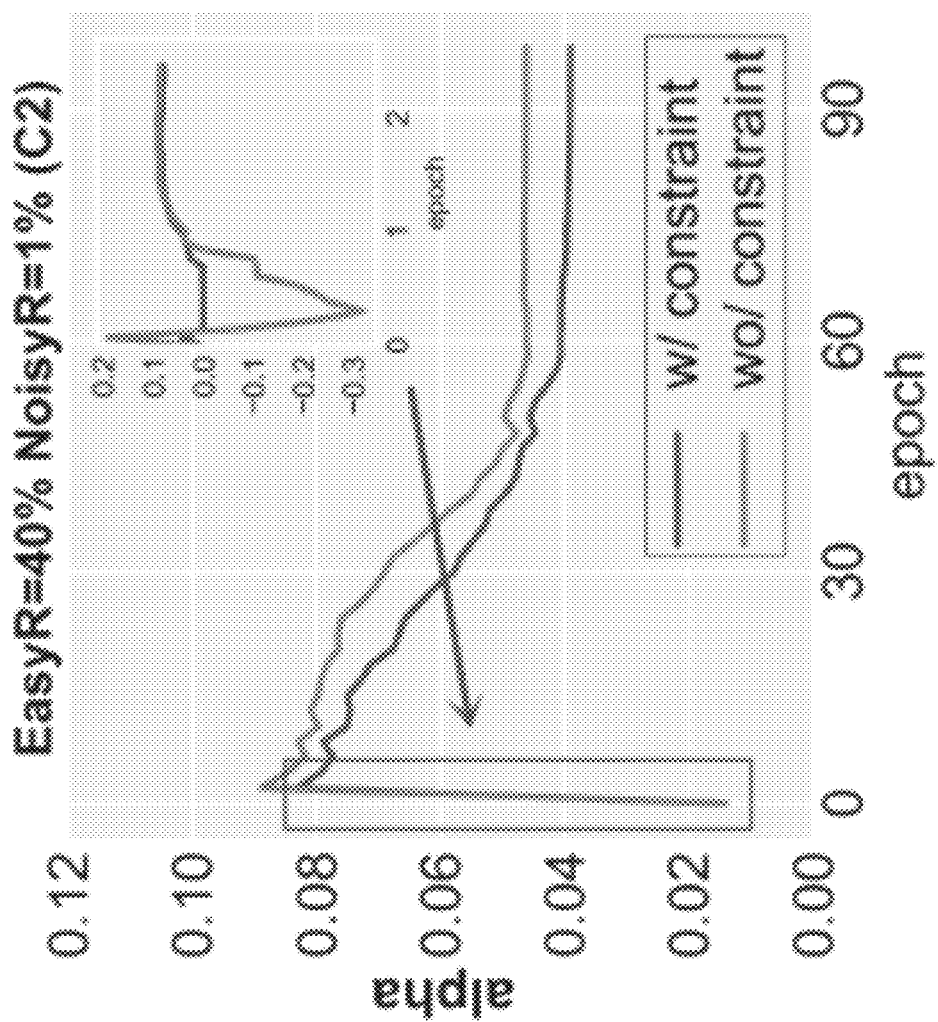

Effect of Alpha Constraint. To verify the effectiveness of non-negative constraint on a, we design an experiment to compare the performance of AUC-M with and without α>0 constraint. We start with C2-IB with imbalance ratio of 1% and add 40% easy (positive) samples and 1% noisy samples to the training set similar to that is done above. We fix margin m=0.1. The curve of testing AUC and the curve of a v.s. number of epoch are plotted in FIG. 3C, FIG. 3D. We observe that the performance with enforcing α≥0 is better than the performance without enforcing α≥0. FIG. 3D gives us a better illustration about the change of α in the first 2 epochs. The plot inside it reveals the change of a in the first 2 epochs. It shows that enforcing the constraint α≥0 prevents the value of α from dropping to a bad region and hence yields a faster convergence and better result.

6. Conclusions

Therefore, in Part I we have considered large-scale robust deep AUC maximization. We have disclosed a new margin-based surrogate loss for AUC to address the two major issues of square loss, and demonstrated its robustness to noisy and easy data. We have thoroughly evaluated the methodologies on four benchmark datasets and two real-world medical data sets. The results not only demonstrate the effectiveness of the new margin loss and also the success of the deep AUC maximization methods on medical image classification tasks.

Part II.

Areas under ROC (AUROC) and precision-recall curves (AUPRC) are common metrics for evaluating classification performance for imbalanced problems. Compared with AUROC, AUPRC is a more appropriate metric for highly imbalanced datasets. While stochastic optimization of AUROC has been studied extensively, principled stochastic optimization of AUPRC has been rarely explored. Here, we disclose a principled technical method to optimize AUPRC for deep learning. Our approach is based on maximizing the averaged precision (AP), which is an unbiased point estimator of AUPRC. We cast the objective into a sum of dependent compositional functions with inner functions dependent on random variables of the outer level. We propose efficient adaptive and non-adaptive stochastic algorithms named SOAP with provable convergence guarantee under mild conditions by leveraging recent advances in stochastic compositional optimization. Extensive experimental results on image and graph datasets demonstrate that our proposed method outperforms prior methods on imbalanced problems in terms of AUPRC. To the best of our knowledge, our work represents the first attempt to optimize AUPRC with provable convergence. The SOAP has been implemented in the libAUC library at https://libauc.org/.

7. Introduction

Although deep learning (DL) has achieved tremendous success in various domains, the standard DL methods have reached a plateau as the traditional objective functions in DL are no longer sufficient to model all requirements in new applications, which slows down the democratization of AI. For instance, in healthcare applications, data is often highly imbalanced, e.g., patients suffering from rare diseases are much less than those suffering from common diseases. In these applications, accuracy (the proportion of correctly predicted examples) is deemed as an inappropriate metric for evaluating the performance of a classifier. Instead, area under the curve (AUC), including area under the ROC curve (AUROC) and area under the Precision-Recall curve (AUPRC), is widely used for assessing the performance of a model. However, optimizing accuracy on training data does not necessarily lead to a satisfactory solution to maximizing AUC [3].

To break the bottleneck for further advancement, DL must be empowered with the capability of efficiently handling novel objectives such as AUC. Recent studies have demonstrated great success along this direction by maximizing AUROC [79]. For example, Yuan et al. [79] proposed a robust deep AUROC maximization method with provable convergence and achieved great success for classification of medical image data. However, to the best of our knowledge, novel DL by maximizing AUPRC has not yet been studied thoroughly. Previous studies [45, 50] have found that when dealing with highly skewed datasets, Precision-Recall (PR) curves could give a more informative picture of an algorithm's performance, which entails the development of efficient stochastic optimization algorithms for DL by maximizing AUPRC.

Compared with maximizing AUROC, maximizing AUPRC is more challenging. The challenges for optimization of AUPRC are two-fold. First, the analytical form of AUPRC by definition involves a complicated integral that is not readily estimated from model predictions of training examples. In practice, AUPRC is usually computed based on some point estimators, e.g., trapezoidal estimators and interpolation estimators of empirical curves, non-parametric average precision estimator, and parametric binomial estimator [35]. Among these estimators, non-parametric average precision (AP) is an unbiased estimate in the limit and can be directly computed based on the prediction scores of samples, which lends itself well to the task of model parameters optimization. Second, a surrogate function for AP is highly complicated and non-convex. In particular, an unbiased stochastic gradient is not readily computed, which makes existing stochastic algorithms such as SGD provide no convergence guarantee. Most existing works for maximizing AP-like function focus on how to compute an (approximate) gradient of the objective function [36, 38, 40, 43, 51, 60, 62, 64, 68, 69], which leave stochastic optimization of AP with provable convergence as an open question.

Can we Design Direct Stochastic Optimization Algorithms Both in SGD-Style and Adam-Style for Maximizing AP with Provable Convergence Guarantee?

In this disclosure, we further propose a systematic and principled solution for addressing this question towards maximizing AUPRC for DL. By using a surrogate loss in lieu of the indicator function in the definition of AP, we cast the objective into a sum of non-convex compositional functions, which resembles a two-level stochastic compositional optimization problem studied in the literature [72, 73]. However, different from existing two-level stochastic compositional functions, the inner functions in our problem are dependent on the random variable of the outer level, which requires us developing a tailored stochastic update for computing an error-controlled stochastic gradient estimator. Specifically, a key feature of the proposed method is to maintain and update two scalar quantities associated with each positive example for estimating the stochastic gradient of the individual precision score at the threshold specified by its prediction score. By leveraging recent advances in stochastic compositional optimization, we propose both adaptive (Adam-style) and non-adaptive (SGD-style) algorithms and establish their convergence under mild conditions. We conduct comprehensive empirical studies on class imbalanced graph and image datasets for learning graph neural networks and deep convolutional neural networks, respectively. We demonstrate that the proposed method can consistently outperform prior approaches in terms of AUPRC. In addition, we show that our method achieves better results when the sample distribution is highly imbalanced between classes and is insensitive to mini-batch size.

8. Related Work

AUROC Optimization. AUROC optimization (which in the literature is simply referred to as AUC optimization) has attracted significant attention in the literature. Recent success of DL by optimizing AUROC on large-scale medical image data has demonstrated the importance of large-scale stochastic optimization algorithms and the necessity of accurate surrogate function [79]. Earlier papers [14, 17] focus on learning a linear model based on the pairwise surrogate loss and could suffer from a high computational cost, which could be as high as quadratic of the size of training data. To address the computational challenge, online and stochastic optimization algorithms have been proposed [7, 21, 23, 31, 32]. Recently, [9, 10, 20, 77] proposed stochastic deep AUC maximization algorithms by formulating the problem as non-convex strongly-concave min-max optimization problem, and derived fast convergence rate under PL condition, and in federated learning setting as well [9]. More recently, Yuan et al. [79] demonstrated the success of their methods on medical image classification tasks, e.g., X-ray image classification, melanoma classification based on skin images. However, an algorithm that maximizes the AUROC might not necessarily maximize AUPRC, which entails the development of efficient algorithms for DL by maximizing AUPRC.

AUPRC Optimization. AUPRC optimization is much more challenging than AUROC optimization since the objective is even not decomposable over pairs of examples. Although AUPRC optimization has been considered in the literature (cf. [46, 68, 63] and references therein), efficient scalable algorithms for DL with provable convergence guarantee is still lacking. Some earlier works tackled this problem by using traditional optimization techniques, e.g., hill climbing search [59], cutting-plane method [80], dynamic programming [70], and by developing acceleration techniques in the framework of SVM [61]. These approaches are not scalable to big data for DL. There is a long list of studies in information retrieval [37, 43, 60, 68] and computer vision [36, 38, 40, 41, 51, 62, 69, 64], which have made efforts towards maximizing the AP score. However, most of them focus on how to compute an approximate gradient of the AP function or its smooth approximation, and provide no convergence guarantee for stochastic optimization based on mini-batch averaging. Due to lack of principled design, these previous methods when applied to deep learning are sensitive to the mini-batch size [38, 68, 69] and usually require a large mini-batch size in order to achieve good performance. In contrast, our stochastic algorithms are designed in a principled way to guarantee convergence without requiring a large mini-batch size as confirmed by our studies as well. Recently, [46] formulates the objective function as a constrained optimization problem using a surrogate function, and then casts it into a min-max saddle-point problem, which facilitates the use of stochastic min-max algorithms. However, they do not provide any convergence analysis for AUPRC maximization. In contrast, this is the first work that directly optimizes a surrogate function of AP (an unbiased estimator of AUPRC in the limit) and provides theoretical convergence guarantee for the proposed stochastic algorithms.

Stochastic Compositional Optimization. Optimization of a two-level compositional function in the form of $\mathbb{E}_\xi[f($ $\mathbb{E}_\zeta[g(W;\zeta)];\xi)]$ where $\xi$ and $\zeta$ are independent random variables, or its finite-sum variant has been studied extensively in the literature [33, 42, 72, 53, 55, 56, 57, 58, 67, 73, 78, 81, 66]. In this disclosure, we formulate the surrogate function of AP into a similar but more complicated two-level compositional function of the form $\mathbb{E}_\xi[f(\mathbb{E}_\zeta g(w;\zeta,\xi))]$, where $\xi$ and $\zeta$ are independent and $\xi$ has a finite support. The key difference between our formulated compositional function and the ones considered in previous work is that the inner function $g(w;\zeta,\xi)$ also depends on the random variable $\xi$ of the outer level. Such subtle difference will complicate the algorithm design and the convergence analysis as well. Nevertheless, the proposed algorithm and its convergence analysis are built on previous studies of stochastic two-level compositional optimization.

9. The Proposed Method

Notations. We consider binary classification problem. Denote by $(x; \mathcal{Y})$ a data pair, where $x \in \mathbb{R}^d$ denotes the input data and $y \in \{1, -1\}$ denotes its class label. Let $h(x)=h_w(x)$ denote the predictive function parameterized by a parameter vector $w \in \mathbb{R}^D$ (e.g., a deep neural network).

Denote by $I(\cdot)$ an indicator functions that outputs 1 if the argument is true and zero otherwise.

To facilitate the presentation, denote by X a random data, by Y its label and by $F=h(X)$ its prediction score. Let $\mathcal{D}=\{(x_1, y_1), \ldots, (x_n, y_n)\}$ denote the set of all training examples and $\mathcal{D}_+=\{x_i:y_i=1\}$ denote the set of all positive examples. Let $n_+=|\mathcal{D}_+|$ denote the number of positive examples. $x_i \sim \mathcal{D}$ means that $x_i$ is randomly sampled from $\mathcal{D}$.

9.1 Background on AUPRC and its Estimator AP

Following the work of Bamber [34], AUPRC is an average of the precision weighted by the probability of a given threshold, which can be expressed as $$A = \int_{-\infty}^{\infty} Pr(Y=1 \mid F \geq c) dPr(F \leq c \mid Y=1),$$

where $Pr(Y=1|F \geq c)$ is the precision at the threshold value of c. The above integral is an importance-sampled Monte Carlo integral, by which we may interpret AUPRC as the fraction of positive examples among those examples whose output values exceed a randomly selected threshold $c \sim F(X)|Y=1$.

For a finite set of examples $\mathcal{D}=\{(x_i, y_i), i=1, \ldots, n\}$ with the prediction score for each example $x_i$ given by $h_w(x_i)$. we consider to use AP to approximate AUPRC, which is given by $$AP = \frac{1}{n_+}\sum_{i=1}^{n} I(y_i=1) \frac{\sum_{s=1}^{n} I(y_s=1)I(h_w(x_s) \geq h_w(x_i))}{\sum_{s=1}^{n} I(h_w(x_s) \geq h_w(x_i))}, \quad (10)$$

where $n_+$ denotes the number of positive examples. It can be shown that AP is an unbiased estimator in the limit $n \to \infty$[35].

However, the non-continuous indicator function $I(h_w(x_s) \geq h_w(x_i))$ in both numerator and denominator in (1) makes the optimization non-tractable. To tackle this, we use a loss function $\ell(w;x_s,x_i)$ as a surrogate function of $I(h_w(x_s) \geq h_w(x_i))$. One can consider different surrogate losses, e.g., hinge loss, squared hinge loss, and smoothed hinge loss, and exponential loss. In this disclosure, we will consider a smooth surrogate loss function to facilitate the development of an optimization algorithm, e.g., a squared hinge loss $\ell(w;x_s;x_i)=(\max\{m-(h_w(x_i)-h_w(x_s)),0\})^2$, where m is a margin parameter. Note that we do not require $\ell$ to be a convex function, hence one can also consider non-convex surrogate loss such as ramp loss. As a result, our problem becomes $$\min_w P(w) = \frac{1}{n_+}\sum_{x_i \in \mathcal{D}_+} \frac{-\sum_{s=1}^{n} I(y_s=1)\ell(w;x_s;x_i)}{\sum_{s=1}^{n} \ell(w;x_s;x_i)}. \quad (11)$$

9.2 Stochastic Optimization of AP (SOAP)

We cast the problem into a finite-sum of compositional functions. To this end, let us define a few notations:

$$g(w; x_s; x_i) = \quad (12)$$
$$[g_1(w; x_j; x_i), g_2(w; x_j; x_i)]^\top = [\ell(w; x_j; x_i)I(y_i=1), \ell(w; x_j; x_i)]^\top$$
$$g_{x_i}(w) = \mathbb{E}_{x_j \sim \mathcal{D}}[g(w; x_j, x_i)],$$

where $$g_{x_i}(w): \mathbb{R}^d \to \mathbb{R}^2.$$

Let $f(s) = -\frac{s_1}{s_2}: \mathbb{R}^2 \to \mathbb{R}.$

Then, we can write the objective function for maximizing AP as a sum of compositional functions:

$$P(w) = \frac{1}{n_+}\sum_{x_i \in \mathcal{D}_+} f(g_{x_i}(w)) = \mathbb{E}_{x_i \sim \mathcal{D}_+}[f(g_{x_i}(w))]. \quad (13)$$

We refer to the above problem as an instance of two-level stochastic dependent compositional functions. It is similar to the two-level stochastic compositional functions considered in literature [72,73] but with a subtle difference. The difference is that in our formulation the inner function $g_{x_i}(w)=\mathbb{E}_{x_j \sim \mathcal{D}}[g(w; x_j, x_i)]$ depends on the random variable $x_i$ of the outer level. This difference makes the proposed algorithm slightly complicated by estimating $g_{x_i}(w)$ separately for each positive example. It also complicates the analysis of the proposed algorithms. Nevertheless, we can still employ the techniques developed for optimizing stochastic compositional functions to design the algorithms and develop the analysis for optimizing the objective (13).

In order to motivate the proposed method, let us consider how to compute the gradient of P(w). Let the gradient of $g_{x_i}(w)$ be denoted by $\nabla_w P_{x_i}(w)^\top = (\nabla_w[g_{x_i}(w)]_1, \nabla_w[g_{x_i}(w)]_2)$. Then we have $$\nabla_w P(w) = \frac{1}{n_+}\sum_{x_i \in \mathcal{D}_+} \nabla_w g_{x_i}(w)^\top \nabla f(g_{x_i}(w)) = \quad (14)$$
$$\frac{1}{n_+}\sum_{x_i \in \mathcal{D}_+} \nabla_w g_{x_i}(w)^\top \left(\frac{-1}{[g_{x_i}(w)]_2}, \frac{[g_{x_i}(w)]_1}{([g_{x_i}(w)]_2)^2}\right)^\top.$$

The major cost for computing $\nabla_w P(w)$ lies at evaluating $g_{x_i}(w)$ and its gradient $\nabla_w g_{x_i}(w)$, which involves passing through all examples in $\mathcal{D}$.

To this end, we will approximate these quantities by stochastic samples. The gradient $\nabla_w g_{x_i}(w)$ can be simply approximated by the stochastic gradient, i.e., $$\hat{\nabla}_w g_{x_i}(w) = \begin{pmatrix} \frac{1}{B} \sum_{x_j \in \mathcal{B}} I(y_j = 1) \nabla \ell(w; x_j, x_i) \\ \frac{1}{B} \sum_{x_j \in \mathcal{B}} \nabla \ell(w; x_j, x_i) \end{pmatrix}, \quad (15)$$

where ß denote a set of B random samples from $\mathcal{D}$. For estimating $g_{x_i}(w) = \mathbb{E}_{x_j \sim \mathcal{D}} g(w; x_j, x_i)$, however, we need to ensure its approximation error is controllable due to the compositional structure such that the convergence can be guaranteed. We borrow a technique from the literature of stochastic compositional optimization [52] by using moving average estimator for estimating $g_{x_i}(w)$ for all positive examples. To this end, we will maintain a matrix $u = [u^1, u^2]$ with each column indexable by any positive example, i.e., $u_{x_i}^1$, $u_{x_i}^2$ correspond to the moving average estimator of $[g_{x_i}(w)]_1$ and $[g_{x_i}(w)]_2$, respectively. The matrix u is updated by the subroutine UG in Algorithm 3, where

---

Algorithm 2: SOAP

1: Input: γ, α, $u_0$, and other parameters for SGD-stype update or Adam-stype update.

2: Initialize $w_1 \in \mathbb{R}^d$, $u \in \mathbb{R}^{|n_+| \times 2}$

3: for t = 1, : : : ; T do

4: Draw a batch of $B_+$ positive samples denoted by $B_+$.

5: Draw a batch of B samples denoted by B.

6: u = UG(B, $B_+$, u, $w_t$, γ, $u_0$)

7: Compute (biased) Stochastic Gradient Estimator $$G(w_t) = \frac{1}{B_+} \sum_{x_i \in B_+} \sum_{x_j \in B} \frac{(u_{x_i}^1 - u_{x_i}^2 I(y_i = 1)) \nabla \ell(w; x_j, x_i)}{B(u_{x_i}^2)^2} \quad (16)$$

8: Update $w_{t+1}$ by a SGD-style method or by a Adam-style method
$w_{t+1} = UW(w_t, G(w_t))$ 9: end for 10: Return: last solution.

---

$γ \in (0,1)$ is a parameter. It is notable that in Step 3 of Algorithm 3, we clip the moving average update of $u_{x_i}^2$ by a lower bound $u_0$, which is a given parameter. This step can ensure the division in computing the stochastic gradient estimator in (16) always valid and is also important for convergence analysis. With these stochastic estimators, we can compute an estimate of $\nabla P(w)$ by equation (16), where $B_+$ includes a batch of sampled positive data. With this stochastic gradient estimator, we can employ SGD-style method and Adam-style shown in Algorithm 4 to update the model parameter w. The final algorithm named as SOAP is presented in Algorithm 4.

---

Algorithm 3: UG(B, $B_+$, u, $w_t$, γ, $u_0$)

1: for each positive $x_i \in B_+$ do

2: Compute $$[\tilde{g}_{x_i}(w_t)]_1 = \frac{1}{|B|} \sum_{\substack{x_j \in B \\ x_j = 1}} \ell(w_t; x_j, x_i)$$

$$[\tilde{g}_{x_i}(w_t)]_2 = \frac{1}{|B|} \sum_{x_j \in B} \ell(w_t; x_j, x_i)$$

3: Compute
$u_{x_i}^1 = (1 - γ) u_{x_i}^1 + γ [\tilde{g}_{x_i}(w_t)]_1$
$u_{x_i}^2 = \max((1 - γ) u_{x_i}^2 + γ [\tilde{g}_{x_i}(w_t)]_2, u_0)$ 4: end for 5: Return u

---

Algorithm 4: UW($w_t$, G($w_t$))

1: Option 1: SGD-style update (paras: α) $w_{t+1} = w_t - \alpha G(w_t)$

2: Option 2: Adam-style update (paras: α, ε, $η_1$, $η_2$)
$h_{t+1} = η_1 h_t + (1 - η_1) G(w_t)$
$v_{t+1} = η_2 \hat{v}_t + (1 - η_2)(G(w_t))^2$ -continued Algorithm 4: UW($w_t$, G($w_t$))

$$w_{t+1} = w_t - \alpha \frac{h_{t+1}}{\sqrt{\epsilon + \hat{v}_{t+1}}}$$

where $\hat{v}_t = v_t$ (Adam) or $\hat{v}_t = \max(\hat{v}_{t-1}, v_t)$ (AMSGrad)

3: Return: $w_{t+1}$

9.3 Convergence Analysis

In this subsection, we present the convergence results of SOAP and also highlight its convergence analysis. To this end, we first present the following assumption.

Assumption 1. Assume that (a) there exists $\Delta_1$ such that $P(w_1) - \min_w P(w) \leq \Delta_1$; (b) there exist C, M>0 such that $\ell(w; x_j, x_i) \geq C$ for any $x_i \in \mathcal{D}_+$, $\ell(w; x_j, x_i) \leq M$, and $\ell(w; x_j, x_i)$ is Lipscthiz continuous and smooth with respect to w for any $x_i \in \mathcal{D}_+$, $x_j \in \mathcal{D}$; (c) there exists V>0 such that $\mathbb{E}_{x_j \sim \mathcal{D}}[\|g(w; x_j, x_i) - g_{x_i}(w)\|^2] \leq V$, and $\mathbb{E}_{x_j \sim \mathcal{D}}[\|\nabla g(w; x_j, x_i) - \nabla g_{x_i}(w)\|^2] \leq V$ for any $x_i$.

With a bounded score function $h_w(x)$ the above assumption can be easily satisfied. Based on the above assumption, we can prove that the objective function P(w) is smooth.

Lemma 1. Suppose Assumption 1 holds, then there exists L>0 such that $P(\cdot)$ is L-smooth. In addition, there exists $u_0 \geq C/n$ such that $g_{x_i}(w) \in \Omega = \{u \in \ell^2, 0 \leq [u]_1 M, u_0 \leq [u]_2 \leq M\}$, $\forall x_i \in \mathcal{D}_+$.

Next, we highlight the convergence analysis of SOAP employing the SGD-stype update and include that for employing Adam-style update in the supplement. Without loss of generality, we assume $|B_+|=1$ and the positive sample in $B_+$ is randomly selected from $\mathcal{D}_+$ with replacement. When the context is clear, we abuse the notations $g_i(w)$ and $u_i$ below, respectively. We first establish the following lemma following the analysis of non-convex optimization.

Lemma 2. With $\alpha \leq \frac{1}{2}$, running T iterations of SOAP (SGD-stype) updates, we have $$\frac{\alpha}{2} \mathbb{E}\left[\sum_{t=1}^{T} \|\nabla P(W_t)\|^2\right] \leq$$

$$\mathbb{E}\left[\sum_{t}(P(w_t) - P(w_{t+1}))\right] + \frac{\alpha C_1}{2}\mathbb{E}\left[\sum_{t=1}^{T} \|g_{i_t}(w_t) - u_{i_t}\|^2\right] + \alpha^2 TC_2,$$

where $i_t$ denotes the index of the sampled positive data at iteration t, $C_1$ and $C_2$ are proper constants.

Our key contribution is the following lemma that bounds the second term in the above upper bound.

Lemma 3. Suppose Assumption 1 holds, with u initialized by (15) for every $x_i \in \mathcal{D}_+$ we have $$\mathbb{E}\left[\sum_{t=1}^{T} \|g_{i_t}(w_t) - u_{i_t}\|^2\right] \leq \frac{n+V}{\gamma} + \gamma VT + 2\frac{n^2 + \alpha^2 TC_3}{\gamma^2}, \quad (17)$$

where $C_3$ is a proper constant.

Remark: The innovation of proving the above lemma is by grouping $u_{i_t}$, $t=1, \ldots, T$ into $n_+$ groups corresponding to the $n_+$ positive examples, and then establishing the recursion of the error $\|g_{i_t}(w_t) - u_{i_t}\|^2$ within each group, and then summing up these recursions together.

Based on the two lemmas above, we establish the following convergence of SOAP with a SGD-style update.

Theorem 1. Suppose Assumption 1 holds, let the parameters be $$\alpha = \frac{1}{n_+^{2/5} T^{3/5}}, \gamma = \frac{n_+^{2/5}}{T^{2/5}}, \forall t \in 1, \ldots, T, \text{ and } T > n_+.$$

Then after running T iterations, SOAP with a SGD-style update satisfies $$\mathbb{E}\left[\frac{1}{T}\sum_{t=1}^{T} \|\nabla P(w_t)\|^2\right] \leq O\left(\frac{N_+^{\frac{2}{5}}}{T^{\frac{2}{5}}}\right),$$

where O suppresses constant numbers.

Remark: To the best of our knowledge, this is the first time a stochastic algorithm was proved to converge for AP maximization.

Similarly, we can establish the following convergence of SOAP by employing an Adam-style update, specifically the AMSGrad update.

Theorem 2. Suppose Assumption 1 holds, let the parameters $$\eta_1 \leq \sqrt{\eta_2} \leq 1, \alpha = \frac{1}{n_+^{\frac{2}{5}} T^{\frac{3}{5}}}, \gamma = \frac{n_+^{\frac{2}{5}}}{T^{\frac{2}{5}}}, \forall t \in 1, \ldots, T, \text{ and } T > n_+.$$

Then after running T iterations, SOAP with an AMSGRAD update satisfies $$\mathbb{E}\left[\frac{1}{T}\sum_{t=1}^{T} \|\nabla P(w_t)\|^2\right] \leq O\left(\frac{n_+^{\frac{2}{5}}}{T^{\frac{2}{5}}}\right),$$

where O suppresses constant numbers.

10. Experiments

In this section, we evaluate the proposed method through comprehensive experiments on imbalanced datasets. We show that the proposed method can outperform prior state-of-the-art methods for imbalanced classification problems. In addition, we conduct experiments on (i) the effects of imbalance ratio; (ii) the insensitivity to batch size and (iii) the convergence speed on testing data; and observe that our method (i) is more advantageous when data is more imbalanced, (ii) is not sensitive to batch size, and (iii) converges faster than baseline methods.

Our proposed optimization algorithm is independent of specific datasets and tasks. Therefore, we perform experiments on both graph and image prediction tasks. In particular, the graph prediction tasks in the contexts of molecular property prediction and drug discovery suffer from very severe imbalance problems as positive labels are very rare while negative samples are abundantly available. Thus, we choose to use graph data intensively in our experiments. Additionally, the graph data we use allow us to vary the imbalance ratio to observe the performance change of different methods.

In all experiments, we compare our method with the following baseline methods. CB-CE refers to a method using a class-balanced weighed cross entropy loss function, in which the weights for positive and negative samples are adjusted with the strategy proposed by Cui et al. [44]. Focal is to up-weight the penalty on hard examples using focal loss [19]. LDAM refers to training with label-distribution-aware margin loss [39]. AUC-M is an AUROC maximization method using a surrogate loss [79]. In addition, we compare with three methods for optimizing AUPRC or AP, namely, the MinMax method [46]—a method for optimizing a discrete approximation of AUPRC, SmoothAP [36]—a method that optimizes a smoothed approximation of AP, and FastAP—a method that uses soft histogram binning to approximate the gradient of AP [38]. We refer to imbalance ratio as the number of positive samples over the total number of examples of a considered set. The hyper-parameters of all methods are fine tuned using cross-validation with training/validation splits mentioned below. For AP maximization methods, we use a sigmoid function to produce the prediction score. For simplicity, we set $u_0=0$ for SOAP and encounter no numerical problems in experiments. As SOAP requires positive samples for updating u to approximate the gradient of surrogate objective, we use a data sampler which samples a few positive examples (e.g., 2) and some negative examples per iteration. The same sampler applies to all methods for fair comparison. The code for reproducing the results is released here [65].

TABLE 4

The test AUPRC on the image datasets with two ResNet models. We report the average AUPRC and standard deviation (within brackets) over 5 runs.

| Datasets | CIFAR-10 | | CIFAR-100 | |
|---|---|---|---|---|
| Networks | ResNet18 | ResNet34 | ResNet18 | ResNet34 |
| CE | 0.7155 (±0.0058) | 0.6844 (±0.0031) | 0.5946 (±0.0031) | 0.5792 (±0.0028) |
| CB-CE | 0.7325 (±0.0039) | 0.6936 (±0.0021) | 0.6165 (±0.0096) | 0.5632 (±0.0129) |
| Focal | 0.7183 (±0.0082) | 0.6943 (±0.0007) | 0.6107 (±0.0093) | 0.5585 (±0.0285) |
| LDAM | 0.7346 (±0.0125) | 0.6745 (±0.0043) | 0.6153 (±0.0100) | 0.5662 (±0.0212) |
| AUC-M | 0.7399 (±0.0013) | 0.6825 (±0.0089) | 0.6103 (±0.0075) | 0.5306 (±0.0230) |
| SmoothAP | 0.7365 (±0.0088) | 0.6909 (±0.0049) | 0.6071 (±0.0143) | 0.5208 (±0.0505) |
| FastAP | 0.7028 (±0.0341) | 0.6798 (±0.0032) | 0.5618 (±0.0351) | 0.5151 (±0.0450) |
| MinMax | 0.7228 (±0.0118) | 0.6806 (±0.0027) | 0.6071 (±0.0064) | 0.5518 (±0.0030) |
| SOAP | 0.7629 (±0.0014) | 0.7012 (±0.0056) | 0.6251 (±0.0053) | 0.6001 (±0.0060) |

10.1 Image Classification

Data. We first conduct experiments on three image datasets: CIFAR10, CIFAR100 and Melanoma dataset [25]. We construct imbalanced version of CIFAR10 and CIFAR100 for binary classification. In particular, for each dataset we manually take the last half of classes as positive class and first half of classes as negative class. To construct highly imbalanced data, we remove 98% of the positive images from the training data and keep the test data unchanged (i.e., the testing data is still balanced). And we split the training dataset into train/validation set at 80%/20% ratio. The Melanoma dataset is from a medical image Kaggle competition, which serves as a natural real imbalanced image dataset. It contains 33,126 labeled medical images, among which 584 images are related to malignant melanoma and labelled as positive samples. Since the test set used by Kaggle organization is not available, we manually split the training data into train/validation/test set at 80%/10%/10% ratio and report the achieved AUPRC on the test set by our method and baselines. The images of Melanoma dataset are always resized to have a resolution of 384×384 in our experiments.

Setup. We use two ResNet [13] models, i.e., ResNet18 and ResNet34, as the backbone networks for image classification. For all methods except for CE, the ResNet models are initialized with a model pre-trained by CE with a SGD optimizer with momentum parameter 0:9. We tune γ the learning rate in a range {1e-5, 1e-4, 1e-3, 1e-2} and the weight decay parameter in a range {1e-6, 1e-5, 1e-4}. Then the last fully connected layer is randomly re-initialized and the network is trained by different methods with the same weight decay parameter but other hyper-parameters individually tuned for fair comparison, e.g., we tune y of SOAP in a range {0.9, 0.99, 0.999}, and tune m in {0.5, 1, 2, 5, 10}.

We refer to this scheme as two-stage training, which is widely used for imbalanced data [60]. We consistently observe that this strategy can bring the model to a good initialization state and improve the final performance of our method and baselines.

Results. Table 4 shows the AUPRC on testing sets of CIFAR-10 and CIFAR-100. We report the results on Melanoma in Table 3. We can observe that the proposed method SOAP outperforms all baselines. It is also striking to see that on Melanoma dataset, our proposed SOAP can outperform all baselines by a large margin, and all other methods have very poor performance. The reason is that the testing set of Melanoma is also imbalanced (imbalanced ratio=1.72%), while the testing sets of CIFAR-10 and CIFAR-100 are balanced. We also observe that the AUROC maximization (AUC-M) does not necessarily optimize AUPRC.

TABLE 5

The test AUPRC values on the HIV and MUV datasets with three graph neural network models. We report the average AUPRC and standard deviation (within brackets) over 3 runs.

| Dataset | Method | GINE | MPNN | ML-MPNN |
|---|---|---|---|---|
| HIV | GE | 0.2774 (±0.0101) | 0.3197 (±0.0050) | 0.2988 (±0.0076) |
| | CB-CE | 0.3082 (±0.0101) | 0.3056 (±0.0018) | 0.3291 (±0.0189) |
| | Focal | 0.3236 (±0.0078) | 0.3136 (±0.0197) | 0.3279 (±0.0173) |
| | LDAM | 0.2904 (±0.0008) | 0.2994 (±0.0128) | 0.3044 (±0.0116) |
| | AUC-M | 0.2998 (±0.0010) | 0.2786 (±0.0456) | 0.3305 (±0.0165) |
| | SmothAP | 0.2686 (±0.0007) | 0.3276 (±0.0063) | 0.3235 (±0.0092) |
| | FastAP | 0.0169 (±0.0031) | 0.0826 (±0.0112) | 0.0202 (±0.0002) |
| | MinMax | 0.2874 (±0.0073) | 0.3119 (±.0075) | 0.3098 (±0.0167) |
| | SOAP | 0.3485 (±0.0083) | 0.3401 (±0.0045) | 0.3547 (±0.0077) |
| MUV | CE | 0.0017 (±0.0001) | 0.0021 (±0.0002) | 0.0025 (±0.0004) |
| | CB-CE | 0.0055 (±0.0011) | 0.0483 (±0.0083) | 0.0121 (±0.0016) |
| | Focal | 0.0041 (±0.0007) | 0.0281 (±0.0141) | 0.0122 (±0.0001) |
| | LDAM | 0.0044 (±0.0022) | 0.0118 (±0.0098) | 0.0059 (±0.0021) |
| | AUC-M | 0.0026 (±0.0001) | 0.0040 (±0.0012) | 0.0028 (±0.0012) |
| | SmothAP | 0.0073 (±0.0012) | 0.0068 (±0.0038) | 0.0029 (±0.0005) |
| | FastAP | 0.0016 (±0.0000) | 0.0023 (±0.0021) | 0.0022 (±0.0012) |
| | MinMax | 0.0028 (±0.0008) | 0.0027 (±0.0005) | 0.0043 (±0.0015) |
| | SOAP | 0.0493 (±0.0261) | 0.3352 (±0.0008) | 0.0236 (±0.0038) |

10.2 Graph Classification for Molecular Property Prediction

Data. To further demonstrate the advantages of our method, we conduct experiments on two graph classification datasets. We use the datasets HIV and MUV from the MoleculeNet [75], which is a benchmark for molecular property prediction. The HIV dataset has 41,913 molecules from the Drug Therapeutics Program (DTP), and the positive samples are molecules tested to have inhibition ability to HIV. The MUV dataset has 93,127 molecules from the PubChem library, and molecules are labelled by whether a bioassay property exists or not. Note that the MUV dataset provides labels of 17 properties in total and we only conduct experiments to predict the third property as this property is more imbalanced. The percentage of positive samples in HIV and MUV datasets are 3.51% and 0.20%, respectively. We use the split of train/validation/test set provided by MoleculeNet.

Molecules are treated as 2D graphs in our experiments, and we use the feature extraction procedure of MoleculeKit [74] to obtain node features of graphs. The same data preprocessing is used for all of our experiments on graph data.

Setup. Many recent studies have shown that graph neural networks (GNNs) are powerful models for graph data analysis [54, 48, 47]. Hence, we use three different GNNs as the backbone network for graph classification, including the message passing neural network (MPNN) [19], an invariant of graph isomorphism network [76] named by GINE [52], and the multi-level message passing neural network (ML-MPNN) proposed by Wang et al. [74]. We use the same two-stage training scheme with a similar hyper-parameter tuning. We pre-train the networks by Adam with 100 epochs and a tuned initial learning rate 0.0005, which is decayed by half after 50 epochs.

Results. The achieved AUPRC on the test set by all methods are presented in Table 5. Results show that our method can outperform all baselines by a large margin in terms of AUPRC, regardless of which model structure is used. These results clearly demonstrate that our method is effective for classification problems in which the sample distribution is highly imbalanced between classes.

10.3 Graph Classification for Drug Discovery

Data. In addition to molecular property prediction, we explore applying our method to drug discovery. Recent studies have shown that GNNs are effective in drug discovery through predicting the antibacterial property of chemical compounds [71]. Such application scenarios involves training a GNN model on labeled datasets and making predictions on a large library of chemical compounds so as to discover new antibiotic. However, because the positive samples in the training data, i.e., compounds known to have antibacterial property, are very rare, there exists very severe class imbalance.

We show that our method can serve as a useful solution to the above problem. We conduct experiments on the MIT AICURES dataset from an open challenge (https://www.aicures.mit.edu/tasks) in drug discovery. The dataset consists of 2097 molecules. There are 48 positive samples that have antibacterial activity to *Pseudomonas aeruginosa*, which is the pathogen leading to secondary lungs infections of COVID-19 patients. We conduct experiments on three random train/validation/test splits at 80%/10%/10% ratio, and report the average AUPRC on the test set over three splits.

TABLE 6

The test AUPRC values on the MIT AICURES dataset with two graph neural networks, and on the Kaggle Melanoma dataset with two CNN models. We report the average AUPRC and standard deviation (within brackets) from 3 independent runs over 3 different train/validation/test splits.

| Data | MIT AICURES | | Kaggle Melanoma | |
|---|---|---|---|---|
| Network | GINE | MPNN | ResNet18 | ResNet34 |
| CE | 0.5037 | 0.6282 | 0.0701 | 0.0582 |
|  | (±0.0718) | (±0.0634) | (±0.0031) | (±0.0016) |
| CB-CE | 0.5655 | 0.6308 | 0.0631 | 0.0721 |
|  | (±0.0453) | (±0.0263) | (±0.0065) | (±0.0054) |
| Focal | 0.5143 | 0.5875 | 0.0549 | 0.0663 |
|  | (±0.1062) | (±0.0774) | (±0.0083) | (±0.0034) |
| LDAM | 0.5236 | 0.6489 | 0.0547 | 0.0539 |
|  | (±0.0551) | (±0.0556) | (±0.0046) | (±0.0069) |
| AUC-M | 0.5149 | 0.5542 | 0.0547 | 0.0972 |
|  | (±0.0748) | (±0.0474) | (±0.0046) | (±0.0035) |
| SmothAP | 0.2899 | 0.4081 | 0.1981 | 0.2787 |
|  | (±0.0220) | (±0.0352) | (±0.0527) | (±0.0232) |
| FastAP | 0.4777 | 0.4518 | 0.0324 | 0.0359 |
|  | (±0.0896) | (±0.1495) | (±0.0087) | (±0.0062) |
| MinMax | 0.5292 | 0.5774 | 0.0593 | 0.0663 |
|  | (±0.0330) | (±0.0468) | (±0.0037) | (±0.0084) |
| SOAP | 0.6639 | 0.6547 | 0.2624 | 0.3152 |
|  | (±0.0515) | (±0.0616) | (±0.0410) | (±0.0337) |

Setup. Following the setup in Sec. 10.2, we use three GNNs: MPNN, GINE and ML-MPNN. We use the same two-stage training scheme with a similar hyper-parameter tuning. We pre-train GNNs by the Adam method for 100 epochs with a batch size of 64 and a tuned learning rate of 0.0005, which is decayed by half at the 50th epoch.

Results. The average test AUPRC from three independent runs over three splits are summarized in Table 6. We can see that our SOAP can consistently outperform all baselines on all three GNN models. Our proposed optimization method can significantly improve the achieved AUPRC of GNN models, indicating that models tend to assign higher confidence scores to molecules with antibacterial activity. This can help identify a larger number of candidate drugs.

We have employed the proposed AUPRC maximization method for improving the testing performance on MIT AICures Challenge and achieved the 1st place. For details, please refer to [54].

10.4 Ablation Studies

Effects of Imbalance Ratio. We now study the effects of imbalance ratio on the performance improvements of our method. We use two datasets Tox21 and ToxCast from the MoleculeNet [75]. The Tox21 and ToxCast contain 8014 and 8589 molecules, respectively. There are 12 property prediction tasks in Tox21, and we conduct experiments on Task 0 and Task 2. Similarly, we select Task 12 and Task 8 of ToxCast for experiments. We use the split of train/validation/test set provided by MoleculeNet. The imbalanced ratios on the training sets are 4.14% for Task 0 of Tox21, 12.00% for Task 2 of Tox21, 2.97% for Task 12 of ToxCast, 8.67% for Task 8 of ToxCast.

Following Sec. 10.2, we test three neural network models MPNN, GINE and ML-MPNN. The hyperparameters for training models are also the same as those in Sec. 10.2. Our SOAP can consistently achieve improved performance when the data is extremely imbalanced. However, it sometimes fails to do so if the imbalance ratio is not too low. Clearly, the improvements from our method are higher when the imbalance ratio of labels is lower. In other words, our method is more advantageous for data with extreme class imbalance.

Figure 7A:
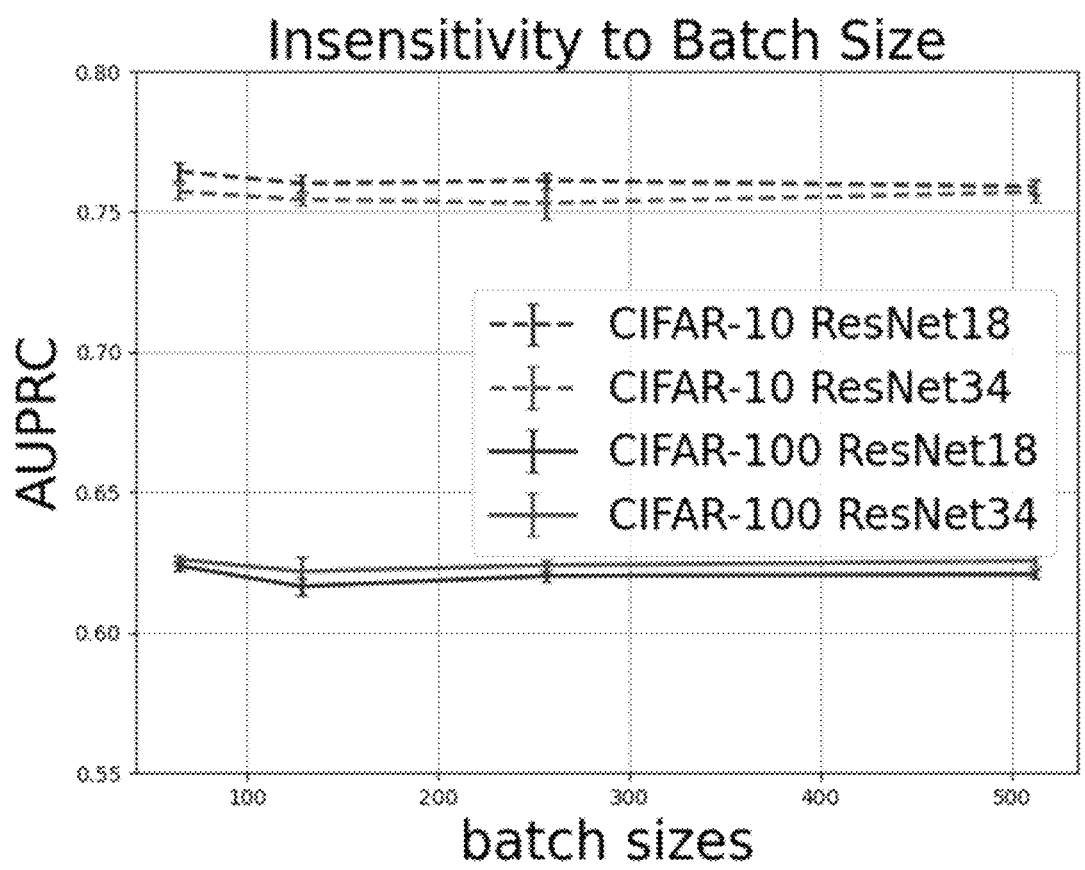
FIG. 7A illustrates a left most: insensitivity to batch size of SOAP.

Insensitivity to Batch Size. We conduct experiments on CIFAR-10 and CIFAR-100 data by varying the mini-batch size for the SOAP algorithm and report results in FIG. 7A. We can see that SOAP is not sensitive to the mini-batch size. This is consistent with our theory. In contrast, many previous methods for AP maximization are sensitive to the mini-batch size [47, 48, 6].

TABLE 7

The test AUPRC over 3 independent runs by SOAP with different surrogate functions.

| Data | CIFAR10 | | CIFAR100 | |
|---|---|---|---|---|
| Networks | ResNet18 | ResNet34 | ResNet18 | ResNet34 |
| Squared Hinge | 0.7629 | 0.7012 | 0.6251 | 0.6001 |
| | (±0.0014) | (±0.0056) | (±0.0053) | (±0.0060) |
| Logistic | 0.7542 | 0.6968 | 0.6378 | 0.5923 |
| | (±0.0024) | (±0.0121) | (±0.0031) | (±0.0101) |
| Sigmoid | 0.7652 | 0.6983 | 0.6271 | 0.5832 |
| | (±0.0035) | (±0.0084) | (±0.0043) | (±0.0054) |

| Data | HIV | | MUV | |
|---|---|---|---|---|
| Networks | GINE | MPNN | GINE | MPNN |
| Squared Hinge | 0.3485 | 0.3401 | 0.0354 | 0.3365 |
| | (±0.0083) | (±0.0045) | (±0.0053) | (±0.0008) |
| Logistic | 0.3436 | 0.3617 | 0.0493 | 0.3352 |
| | (±0.0043) | (±0.0031) | (±0.0031) | (±0.0008) |
| Sigmoid | 0.3387 | 0.3629 | 0.0298 | 0.3362 |
| | (±0.0051) | (±0.0063) | (±0.0043) | (±0.0009) |

Figure 6A:
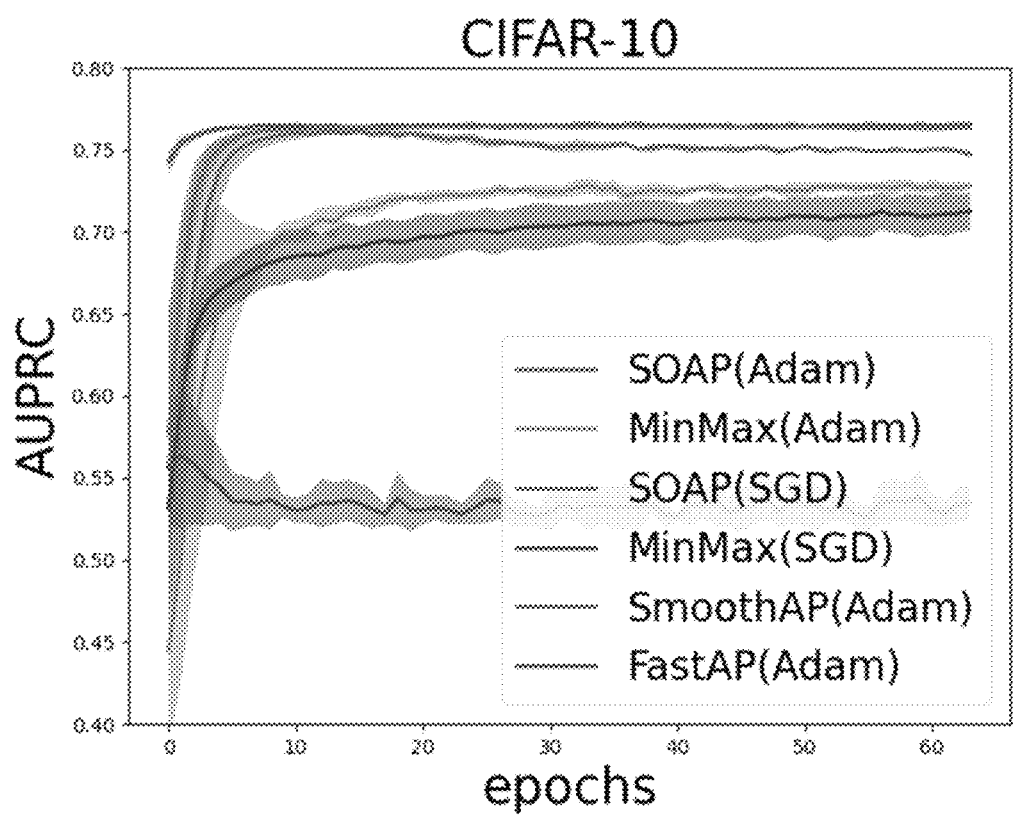
FIG. 6A, FIG. 6B, and FIG. 6C show a comparison of convergence of different methods in terms of test AUPRC scores on CIFAR-10, CIFAR100 and MIT AICURES data, respectively.
Figure 6B:
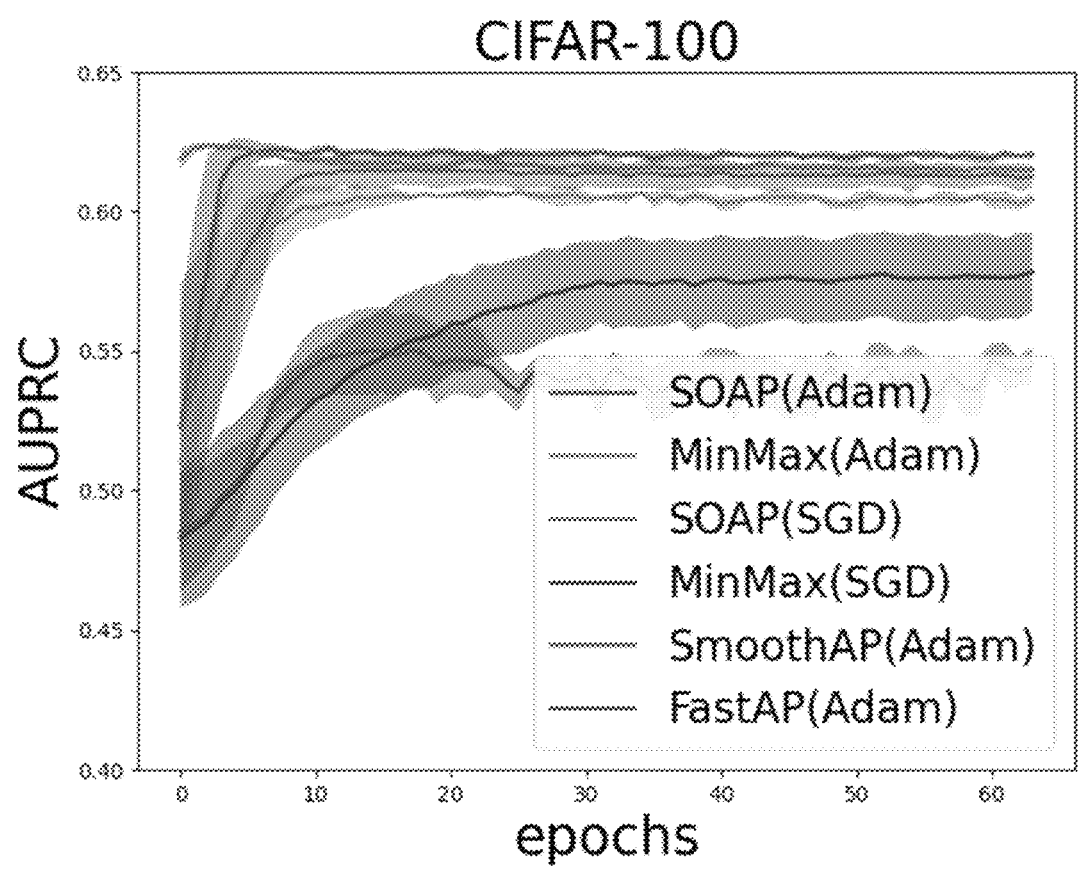
Figure 6C:
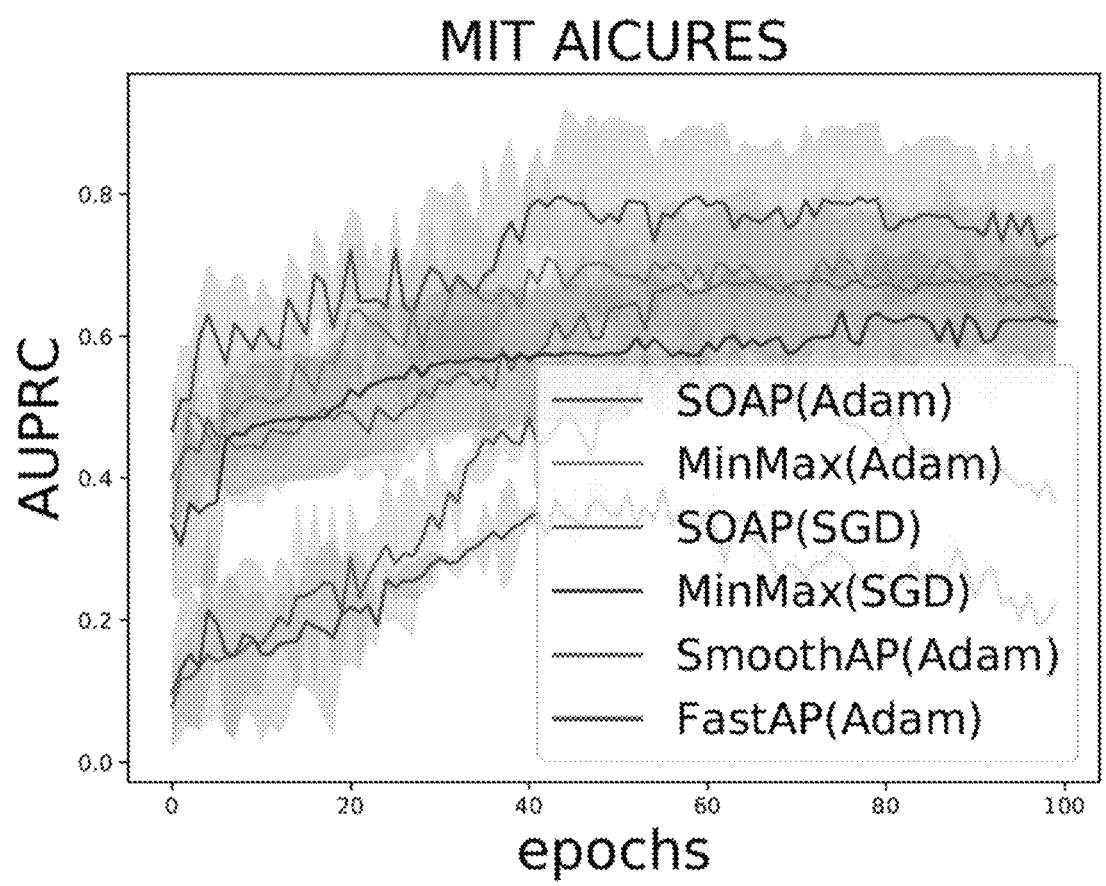

Convergence Speed. We report the convergence curves of different methods for maximizing AUPRC or AP in FIG. 6A to FIG. 6C on different datasets. We can see that the proposed SOAP algorithms converge much faster than other baseline methods.

More Surrogate Losses. To verify the generality of SOAP, we evaluate the performance of SOAP with two more different surrogate loss functions $\ell(w; x_s, x_i)$ as a surrogate function of the indicator $I(h_w(x_s) \geq h_w(x_i))$, namely, the logistic loss, $$\ell(w; x_s, x_i) = -\log \frac{1}{1 + \exp(-c(\ell(h_w(x_i) - h_w(x_s))))},$$

and the sigmoid loss, $$\ell(w; x_s, x_i) = \frac{1}{1 + \exp(c(\ell(h_w(x_i) - h_w(x_s))))},$$

where c is a hyperparameter. We tune $c \in \{1,2\}$ in our experiments. We conduct experiments on CIFAR10, CIFAR100 following the experimental setting in Section 10.1 for the image data. For the graph data, we conduct experiments on HIV, MUV data following the experimental setting in Section 10.2. We report the results in Table 7. We can observe that SOAP has similar results with different surrogate loss functions.

Figure 7B:
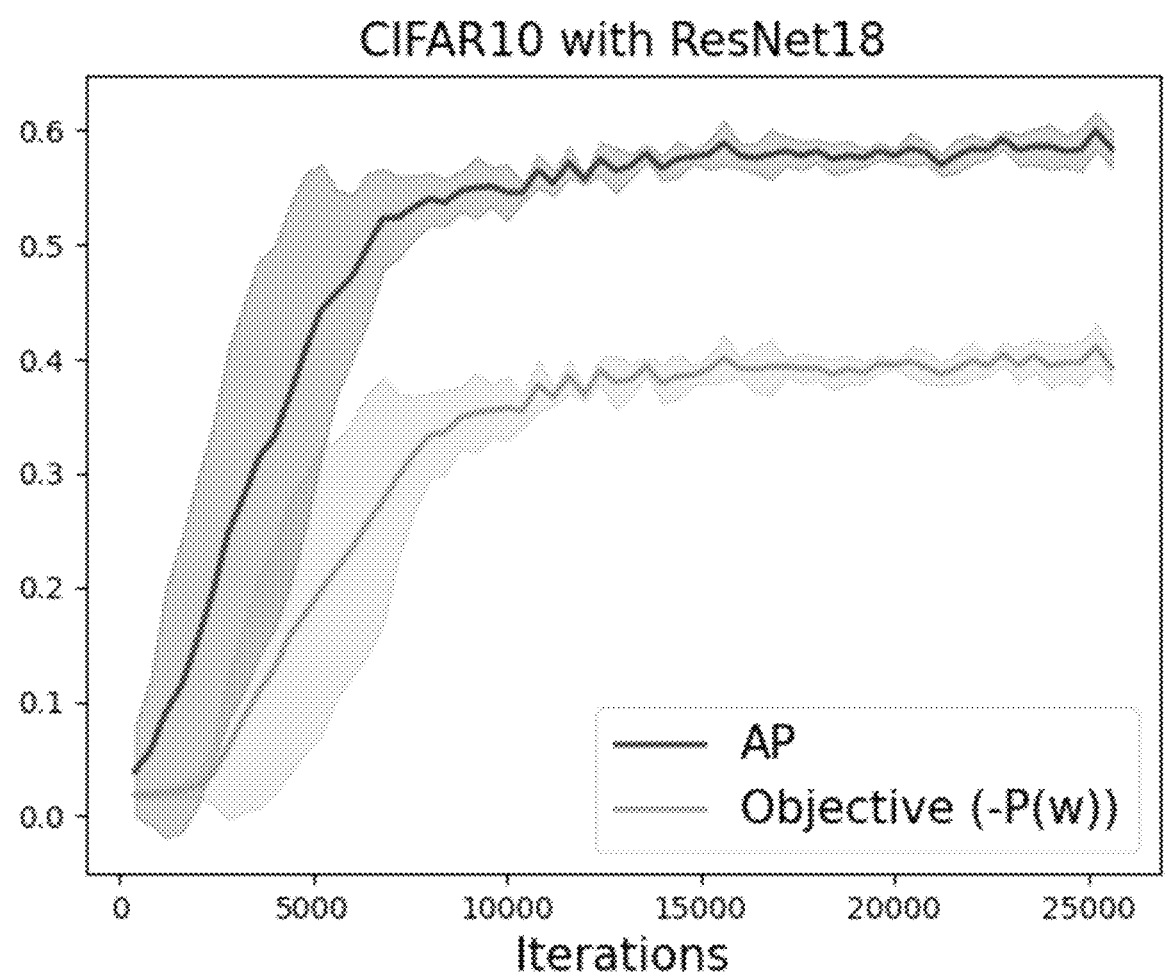
FIG. 7B, FIG. 7C illustrate consistency between AP and Surrogate Objective $-P(w)$ vs Iterations on CIFAR10 and CIFAR100.
Figure 7C:
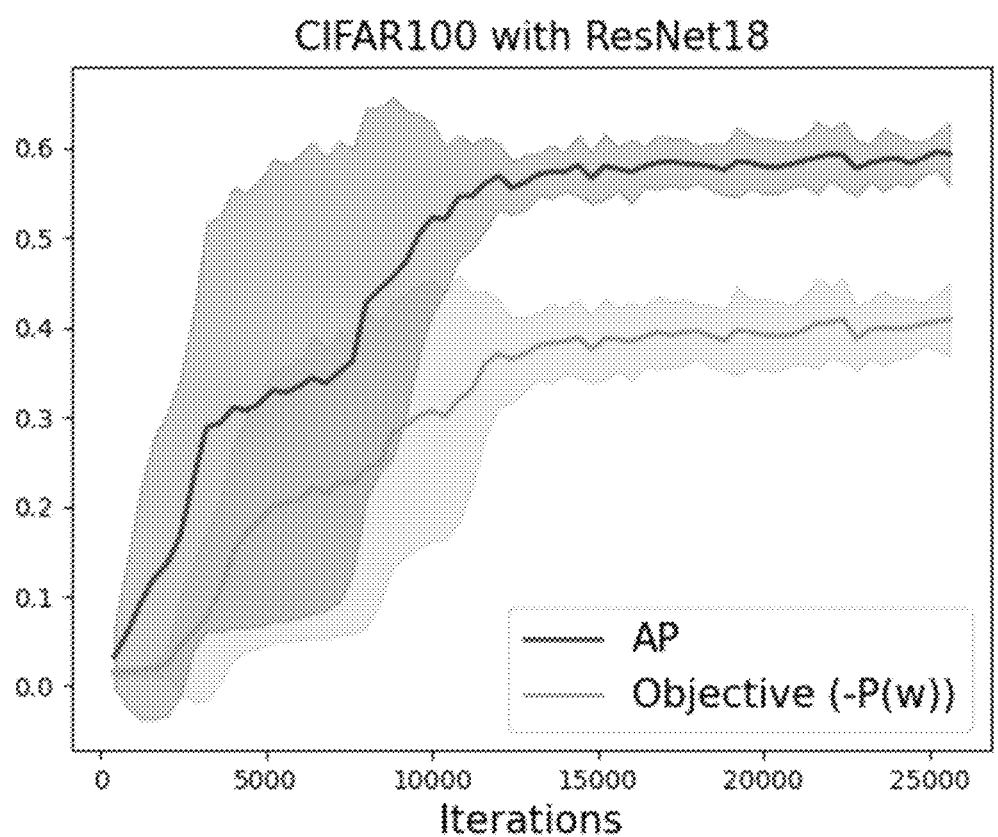

Consistency. Finally, we show the consistency between the Surrogate Objective −P(w) and AP by plotting the convergence curves on different datasets in FIG. 7B, 7C. It is obvious two see the consistency between our surrogate objective and the true AP.

11. Conclusion

In this work, we have proposed a stochastic method to optimize AUPRC that can be used in deep learning for tackling highly imbalanced data. Our approach is based on maximizing the averaged precision, and we cast the objective into a sum of dependent compositional functions. We proposed efficient adaptive and non-adaptive stochastic algorithms with provable convergence guarantee to compute the solutions. Extensive experimental results on graph and image datasets demonstrate that our proposed method can achieve promising results, especially when the class distribution is highly imbalanced. One limitation of SOAP is its convergence rate is still slow. In Although specific examples have been set forth herein, numerous options, variations, and alternatives are contemplated. For example, any number of different software applications or platforms may be used. In addition, although emphasis has been placed on medical data including medical image data, the methodologies described herein may be used for other types of data as well. The methods described herein or aspects thereof may be incorporated into software in the form of instructions stored on a non-transitory computer or machine readable medium which may be used in learning a model or applying a deep neural network to input in order to provide a prediction. It should be further understood that different types of learning may be used included supervised learning, unsupervised learning, and partially, weakly, or semi-supervised learning as may be appropriate in a particular context such as the data sets available.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments may be described herein as implementing mathematical methodologies including logic or a number of components, modules, instructions, or algorithms. Such implementations in may be embodied in software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a hospital, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The invention is not to be limited to the particular embodiments described herein. In particular, the invention contemplates numerous variations in segmentation. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

12. References

Each of the references is hereby incorporated by reference in its entirety as if set forth herein.

[1] The international skin imaging collaboration (isic). https://www.isic-archive.com/. 2020-08.

[2] Stéphan Clémencon, Gábor Lugosi, Nicolas Vayatis, et al. Ranking and empirical minimization of u-statistics. *The Annals of Statistics*, 36(2):844-874, 2008.

[3] Corinna Cortes and Mehryar Mohri. Auc optimization vs. error rate minimization. In S. Thrun, L. K. Saul, and B. Schölkopf, editors, *Advances in Neural Information Processing Systems* 16, pages 313-320. MIT Press, 2004.

[4] Chris Deotte. Triple stratified kfold with tfrecords. In *Kaggle*, 2020.

[5] Jeremy Elson, John R Douceur, Jon Howell, and Jared Saul. Asirra: a captcha that exploits interest-aligned manual image categorization. In *ACM Conference on Computer and Communications Security*, volume 7, pages 366-374, 2007.

[6] Andre Esteva, Brett Kuprel, Roberto A Novoa, Justin Ko, Susan M Swetter, Helen M Blau, and Sebastian Thrun. Dermatologist-level classification of skin cancer with deep neural networks. *Nature*, 542(7639): 115-118, 2017.

[7] Wei Gao, Rong Jin, Shenghuo Zhu, and Zhi-Hua Zhou. Onepass auc optimization. *In International conference on machine learning*, pages 906-914, 2013.

[8] Wei Gao and Zhi-Hua Zhou. On the consistency of auc pairwise optimization. In *IJCAI*, pages 939-945. Citeseer, 2015.

[9] Zhishuai Guo, Mingrui Liu, Zhuoning Yuan, Li Shen, Wei Liu, and Tianbao Yang. Communication-efficient distributed stochastic AUC maximization with deep neural networks. In *International Conference on Machine Learning*, 2020.
[10] Zhishuai Guo, Zhuoning Yuan, Yan Yan, and Tianbao Yang. Fast objective and duality gap convergence for nonconvex strongly-concave min-max problems. *arXiv preprint arXiv:* 2006.06889, 2020.
[11] Qishen Ha, Bo Liu, and Fuxu Liu. Identifying melanoma images using efficientnet ensemble: Winning solution to the siim-isic melanoma classification challenge. *arXiv preprint arXiv:*2010.05351, 2020.
[12] James A Hanley and Barbara J McNeil. The meaning and use of the area under a receiver operating characteristic (roc) curve. *Radiology*, 143(1):29-36, 1982.
[13] Kaiming He, Xiangyu Zhang, Shaoqing Ren, and Jian Sun. Deep residual learning for image recognition. In *Proceedings of the IEEE conference on computer vision and pattern recognition*, pages 770-778, 2016.
[14] Alan Herschtal and Bhavani Raskutti. Optimising area under the roc curve using gradient descent. In *Proceedings of the twenty-first international conference on Machine learning*, page 49, 2004.
[15] Gao Huang, Zhuang Liu, Laurens Van Der Maaten, and Kilian Q Weinberger. Densely connected convolutional networks. In *Proceedings of the IEEE conference on computer vision and pattern recognition*, pages 4700-4708, 2017.
[16] Jeremy Irvin, Pranav Rajpurkar, Michael Ko, Yifan Yu, Silviana Ciurea-Ilcus, Chris Chute, Henrik Marklund, Behzad Haghgoo, Robyn Ball, Katie Shpanskaya, et al. Chexpert: A large chest radiograph dataset with uncertainty labels and expert comparison. In *Proceedings of the AAAI Conference on Artificial Intelligence*, volume 33, pages 590-597, 2019.
[17] Thorsten Joachims. A support vector method for multivariate performance measures. In *Proceedings of the 22nd international conference on Machine learning*, pages 377-384, 2005.
[18] Bingyi Kang, Saining Xie, Marcus Rohrbach, Zhicheng Yan, Albert Gordo, Jiashi Feng, and Yannis Kalantidis. Decoupling representation and classifier for long-tailed recognition. In *International Conference on Learning Representations*, 2020.
[19] Tsung-Yi Lin, Priya Goyal, Ross Girshick, Kaiming He, and Piotr Doll'ar. Focal loss for dense object detection. In *Proceedings of the IEEE international conference on computer vision*, pages 2980-2988, 2017.
[20] Mingrui Liu, Zhuoning Yuan, Yiming Ying, and Tianbao Yang. Stochastic auc maximization with deep neural networks. *arXiv preprint arXiv:* 1908.10831, 2019.
[21] Mingrui Liu, Xiaoxuan Zhang, Zaiyi Chen, Xiaoyu Wang, and Tianbao Yang. Fast stochastic auc maximization with o(1/n)-convergence rate. In *International Conference on Machine Learning*, pages 3189-3197, 2018.
[22] Arlo J Miller and Martin C Mihm Jr. Melanoma. *New England Journal of Medicine*, 355(1):51-65, 2006.
[23] Michael Natole, Yiming Ying, and Siwei Lyu. Stochastic proximal algorithms for auc maximization. In *International Conference on Machine Learning*, pages 3710-3719, 2018.
[24] Hieu H. Pham, Tung T. Le, Dat T. Ngo, Dat Q. Tran, and Ha Q. Nguyen. Interpreting chest x-rays via fcnngs that exploit hierarchical disease dependencies and uncertainty labels. In *Medical Imaging with Deep Learning*, 2020.
[25] Veronica Rotemberg, Nicholas Kurtansky, Brigid Betz-Stablein, Liam Caffery, Emmanouil Chousakos, Noel Codella, Marc Combalia, Stephen Dusza, Pascale Guitera, David Gutman, et al. A patient-centric dataset of images and metadata for identifying melanomas using clinical context. *arXiv preprint arXiv:*2008.07360, 2020.
[26] Leslie N Smith. Cyclical learning rates for training neural networks. In 2017 *IEEE Winter Conference on Applications of Computer Vision (WACV)*, pages 464-472. IEEE, 2017.
[27] Jeremias Sulam, Rami Ben-Ari, and Pavel Kisilev. Maximizing auc with deep learning for classification of imbalanced mammogram datasets. In *VCBM*, pages 131-135, 2017.
[28] Mingxing Tan and Quoc V Le. Efficientnet: Rethinking model scaling for convolutional neural networks. *arXiv preprint arXiv:* 1905.11946, 2019.
[29] Nan Wu, Jason Phang, Jungkyu Park, Yiqiu Shen, Zhe Huang, Masha Zorin, Stanislaw Jastrzkebski, Thibault F'evry, Joe Katsnelson, Eric Kim, et al. Deep neural networks improve radiologists' performance in breast cancer screening. *IEEE transactions on medical imaging*, 39(4):1184-1194, 2019.
[30] Wenwu Ye, Jin Yao, Hui Xue, and Yi Li. Weakly supervised lesion localization with probabilistic-cam pooling, 2020.
[31] Yiming Ying, Longyin Wen, and Siwei Lyu. Stochastic online auc maximization. In *Advances in neural information processing systems*, pages 451-459, 2016.
[32] Peilin Zhao, Steven C. H. Hoi, Rong Jin, and Tianbao Yang. Online auc maximization. In *ICML*, pages 233-240, 2011. 2, 3
[33] Balasubramanian, K., Ghadimi, S., and Nguyen, A. Stochastic multi-level composition optimization algorithms with level-independent convergence rates. *CoRR*, abs/2008.10526, 2020.
[34] Bamber, D. The area above the ordinal dominance graph and the area below the receiver operating characteristic graph. *Journal of Mathematical Psychology*, 12:387-415, 1975.
[35] Boyd, K., Eng, K. H., and Page, C. D. Area under the precision-recall curve: Point estimates and confidence intervals. In Blockeel, H., Kersting, K., Nijssen, S., and Zelezny, F. (eds.), *Machine Learning and Knowledge Discovery in Databases*, pp. 451-466, Berlin, Heidelberg, 2013. Springer Berlin Heidelberg.
[36] Brown, A., Xie, W., Kalogeiton, V., and Zisserman, A. Smooth-ap: Smoothing the path towards large-scale image retrieval. In *European Conference on Computer Vision*, pp. 677-694. Springer, 2020.
[37] Burges, C., Ragno, R., and Le, Q. Learning to rank with nonsmooth cost functions. In Schölkopf, B., Platt, J., and Hoffman, T. (eds.), *Advances in Neural Information Processing Systems*, volume 19. MIT Press, 2007.
[38] Cakir, F., He, K., Xia, X., Kulis, B., and Sclaroff, S. Deep metric learning to rank. In *Proceedings of the IEEE/CVF Conference on Computer Vision and Pattern Recognition (CVPR)*, June 2019.
[39] Cao, K., Wei, C., Gaidon, A., Arechiga, N., and Ma, T. Learning imbalanced datasets with label-distribution-aware margin loss. In *Advances in Neural Information Processing Systems*, pp. 1567-1578, 2019.
[40] Chen, K., Li, J., Lin, W., See, J., Wang, J., Duan, L., Chen, Z., He, C., and Zou, J. Towards accurate one-stage object detection with ap-loss. In *Proceedings of the IEEE/CVF Conference on Computer Vision and Pattern Recognition (CVPR)*, June 2019.

[41] Chen, K., Lin, W., See, J., Wang, J., Zou, J., et al. Ap-loss for accurate one-stage object detection. *IEEE Transactions on Pattern Analysis and Machine Intelligence*, 2020.

[42] Chen, T., Sun, Y., and Yin, W. Solving stochastic compositional optimization is nearly as easy as solving stochastic optimization. *IEEE Transactions on Signal Processing*, 69:4937-4948, 2021.

[43] Chen, W., Liu, T.-Y., Lan, Y., Ma, Z., and Li, H. Ranking measures and loss functions in learning to rank. In *Proceedings of the 22nd International Conference on Neural Information Processing Systems, NIPS'09*, pp. 315-323, Red Hook, NY, USA, 2009. Curran Associates Inc. ISBN 9781615679119.

[44] Cui, Y., Jia, M., Lin, T.-Y., Song, Y., and Belongie, S. Class-balanced loss based on effective number of samples. In *Proceedings of the IEEE/CVF Conference on Computer Vision and Pattern Recognition*, pp. 9268-9277, 2019.

[45] Davis, J. and Goadrich, M. The Relationship Between Precision-Recall and ROC Curves. In *ICML '06: Proceedings of the 23rd international conference on Machine learning*, pp. 233-240, New York, NY, USA, 2006. ACM. ISBN 1-59593-383-2.

[46] Eban, E., Schain, M., Mackey, A., Gordon, A., Saurous, R. A., and Elidan, G. Scalable learning of non-decomposable objectives. In *International Conference on Artificial Intelligence and Statistics (AISTATS)*, 2017.

[47] Gao, H. and Ji, S. Graph u-nets. In Chaudhuri, K. and Salakhutdinov, R. (eds.), Proceedings of the 36th International Conference on Machine Learning, volume 97 of *Proceedings of Machine Learning Research*, pp. 2083-2092. PMLR, 09-15 Jun. 2019.

[48] Gao, H., Wang, Z., and Ji, S. Large-scale learnable graph convolutional networks. In *Proceedings of the 24th ACM SIGKDD International Conference on Knowledge Discovery & Data Mining, KDD '18*, pp. 1416-1424, New York, NY, USA, 2018. Association for Computing Machinery.

[49] Gilmer, J., Schoenholz, S. S., Riley, P. F., Vinyals, O., and Dahl, G. E. Neural message passing for quantum chemistry. In Precup, D. and Teh, Y. W. (eds.), *Proceedings of the 34th International Conference on Machine Learning*, volume 70 of Proceedings of Machine Learning Research, pp. 1263-1272, International Convention Centre, Sydney, Australia, 2017.

[50] Goadrich, M., Oliphant, L., and Shavlik, J. Gleaner: Creating ensembles of first order clauses to improve recall-precision curves. In *Machine Learning*, pp. 2006, 2006.

[51] Henderson, P. and Ferrari, V. End-to-end training of object class detectors for mean average precision. In *Computer Vision—ACCV 2016*, pp. 198-213. Springer International Publishing, 2017. doi: 10.1007/978-3-319-54193-8_13. URL https://doi.org/10.1007%2F978-3-319-54193-8_13.

[52] Hu, W., Liu, B., Gomes, J., Zitnik, M., Liang, P., Pande, V., and Leskovec, J. Strategies for pre-training graph neural networks. In *Proceedings of the 7th international conference on learning representations*, 2019.

[53] Huo, Z., Gu, B., Liu, J., and Huang, H. Accelerated method for stochastic composition optimization with nonsmooth regularization. In McIlraith, S. A. and Weinberger, K. Q. (eds.), *Proceedings of the Thirty-Second AAAI Conference on Artificial Intelligence*, (AAAI-18), pp. 3287-3294, 2018.

[54] Kipf, T. N. and Welling, M. Semi-supervised classification with graph convolutional networks. In *5th International Conference on Learning Representations*, 2017.

[55] Lian, X., Wang, M., and Liu, J. Finite-sum composition optimization via variance reduced gradient descent. In *Proceedings of the 20th International Conference on Artificial Intelligence and Statistics (AISTATS)*, pp. 1159-1167, 2017.

[56] Lin, T., Fan, C., Wang, M., and Jordan, M. I. Improved oracle complexity for stochastic compositional variance reduced gradient. *CoRR*, abs/1806.00458, 2018.

[57] Liu, L., Liu, J., Hsieh, C., and Tao, D. Stochastically controlled stochastic gradient for the convex and non-convex composition problem. *CoRR*, abs/1809.02505, 2018.

[58] Liu, L., Liu, J., and Tao, D. Dualityfree methods for stochastic composition optimization. *IEEE Transactions on Neural Networks and Learning Systems*, 30(4): 1205-1217, 2019.

[59] Metzler, D. and Croft, W. B. A markov random field model for term dependencies. In *Proceedings of the 28th Annual International ACM SIGIR Conference on Research and Development in Information Retrieval*, SIGIR, 2005.

[60] Metzler, D. and Croft, W. B. A markov random field model for term dependencies. In *Proceedings of the 28th annual International ACM SIGIR Conference on Research and Development in Information Retrieval*, pp. 472-479, 2005.

[61] Mohapatra, P., Jawahar, C., and Kumar, M. P. Efficient optimization for average precision svm. In *Advances in Neural Information Processing Systems*, 2014.

[62] Mohapatra, P., Rolinek, M., Jawahar, C. V., Kolmogorov, V., and Kumar, M. Efficient optimization for rank-based loss functions. 2018 *IEEE/CVF Conference on Computer Vision and Pattern Recognition*, pp. 3693-3701, 2018.

[63] Narasimhan, H., Cotter, A., and Gupta, M. Optimizing generalized rate metrics with three players. In Wallach, H., Larochelle, H., Beygelzimer, A., d'Alché-Buc, F., Fox, E., and Garnett, R. (eds.), *Advances in Neural Information Processing Systems*, volume 32. Curran Associates, Inc., 2019.

[64] Oksuz, K., Cam, B. C., Akbas, E., and Kalkan, S. A ranking-based, balanced loss function unifying classification and localisation in object detection. *In Advances in Neural Information Processing Systems*, 2020.

[65] Qi, Q. Soap code for reproducing results. https://github.com/Optimization-AI, 2021.

[66] Qi, Q., Xu, Y., Jin, R., Yin, W., and Yang, T. Attentional biased stochastic gradient for imbalanced classification. *arXiv preprint arXiv:2012.06951*, 2020.

[67] Qi, Q., Guo, Z., Xu, Y., Jin, R., and Yang, T. An online method for a class of distributionally robust optimization with non-convex objectives. In *Proceedings of Thirty-fifth Conference on Neural Information Processing Systems (NeurIPS)*, 2021.

[68] Qin, T., Liu, T.-Y., and Li, H. A general approximation framework for direct optimization of information retrieval measures. Technical Report MSR-TR-2008-164, November 2008.

[69] Rolinek, M., Musil, V., Paulus, A., Vlastelica, M., Michaelis, C., and Martius, G. Optimizing rank-based metrics with blackbox differentiation. *In Proceedings of the IEEE/CVF Conference on Computer Vision and Pattern Recognition (CVPR)*, June 2020.

[70] Song, Y., Schwing, A., Richard, and Urtasun, R. Training deep neural networks via direct loss minimization. In Balcan, M. F. and Weinberger, K. Q. (eds.), *Proceedings of The 33rd International Conference on Machine Learning, volume 48 of Proceedings of Machine Learning Research*, pp. 2169-2177, New York, NY, USA, 20-22 Jun. 2016. PMLR.

[71] Stokes, J. M., Yang, K., Swanson, K., Jin, W., Cubillos-Ruiz, A., Donghia, N. M., MacNair, C. R., French, S., Carfrae, L. A., Bloom-Ackerman, Z., et al. A deep learning approach to antibiotic discovery. Cell, 180(4):688-702, 2020.

[72] Wang, M., Fang, E. X., and Liu, H. Stochastic compositional gradient descent: algorithms for minimizing compositions of expected-value functions. *Mathematical Programming*, 161(1-2): 419-449, 2017.

[73] Wang, M., Liu, J., and Fang, E. X. Accelerating stochastic composition optimization. *Journal Machine Learning Research*, 18:105:1-105:23, 2017.

[74] Wang, Z., Liu, M., Luo, Y., Xu, Z., Xie, Y., Wang, L., Cai, L., Qi, Q., Yuan, Z., Yang, T., and Ji, S. *Advanced graph and sequence neural networks for molecular property prediction and drug discovery*, 2021.

[75] Wu, Z., Ramsundar, B., Feinberg, E. N., Gomes, J., Geniesse, C., Pappu, A. S., Leswing, K., and Pande, V. MoleculeNet: a benchmark for molecular machine learning. *Chemical science*, 9 (2):513-530, 2018.

[76] Xu, K., Hu, W., Leskovec, J., and Jegelka, S. How powerful are graph neural networks? In *7th International Conference on Learning Representations*, 2019.

[77] Yan, Y., Xu, Y., Lin, Q., Liu, W., and Yang, T. Optimal epoch stochastic gradient descent ascent methods for min-max optimization. In *Advances in Neural Information Processing Systems* 33 (*NeurIPS*), 2020.

[78] Yu, Y. and Huang, L. Fast stochastic variance reduced ADMM for stochastic composition optimization. In *Proceedings of the Twenty-Sixth International Joint Conference on Artificial Intelligence (IJCAI)*, pp. 3364-3370, 2017.

[79] Yuan, Z., Yan, Y., Sonka, M., and Yang, T. Robust deep auc maximization: A new surrogate loss and empirical studies on medical image classification. *arXiv preprint arXiv:2012.03173*, 2020.

[80] Yue, Y., Finley, T., Radlinski, F., and Joachims, T. A support vector method for optimizing average precision. In *Proceedings of the 30th Annual International ACM SIGIR Conference on Research and Development in Information Retrieval, SIGIR '07*, pp. 271-278, New York, NY, USA, 2007. Association for Computing Machinery.

[81] Zhang, J. and Xiao, L. A composite randomized incremental gradient method. In Chaudhuri, K. and Salakhutdinov, R. (eds.), *Proceedings of the 36th International Conference on Machine Learning (ICML)*, volume 97, pp. 7454-7462, 2019.

What is claimed is:

1. A computer-based automated method of performing classification, the method comprising:
  learning a deep neural network by maximizing an area under a receiver operating characteristic curve (AUC) score using a margin-based surrogate loss function;
  receiving an input into the deep neural network;
  processing the input to the deep neural network to generate a prediction, wherein the prediction comprises a classification of the input;
  wherein said computer-based automated method is performed by executing instructions in at least one processor, and wherein said instructions are stored on a non-transitory memory readable by the at least one processor.

2. The method of claim 1 wherein the input comprises at least one medical image.

3. The method of claim 2 wherein the classification of the input identifies at least one disease condition.

4. The method of claim 3 wherein the at least one medical image comprises a chest x-ray image.

5. The method of claim 3 wherein the at least one image comprises a skin lesion image and wherein the at least one disease condition comprises a melanoma.

6. The method of claim 1 wherein the margin-based surrogate loss function includes a tunable margin parameter.

7. The method of claim 1 wherein the margin-based surrogate loss function comprises a modified square loss function with a tunable parameter.

8. The method of claim 1 wherein the margin-based surrogate loss function is reformulated as a min-max optimization problem.

9. The method of claim 8 wherein the min-max optimization problem is solved using a min-max optimization algorithm.

10. The method of claim 1 wherein the margin-based surrogate loss function is selected from a set consisting of a hinge loss, a squared hinge loss, a smoothed hinge loss, and an exponential loss.

11. A computer-based automated method of performing medical image classification, the method comprising:
  learning a deep neural network by maximizing an area under a receiver operating characteristic curve (AUC) score using a margin-based surrogate loss function;
  receiving an input into a deep neural network, the input comprising at least one medical image;
  processing the input to the deep neural network to generate a prediction, wherein the prediction comprises a classification of the input, the classification indicative of presence or absence of a disease condition;
  wherein said computer-based automated method is performed by executing instructions in at least one processor, and wherein said instructions are stored on a non-transitory memory readable by the at least one processor.

12. The method of claim 11 wherein the at least one medical image comprises a chest x-ray image.

13. The method of claim 11 wherein the at least one image comprises a skin lesion image and wherein the disease condition is a melanoma condition.

14. The method of claim 11 wherein the margin-based surrogate loss function includes a tunable margin parameter.

15. The method of claim 11 wherein the margin-based surrogate loss function comprises a modified square loss function with a tunable parameter.

16. The method of claim 11 wherein the margin-based surrogate loss function is reformulated as a min-max optimization problem.

17. A computer-based automated method of performing classification, the method comprising:
  generating a deep learning model which provides for learning discriminate features through an Empirical Risk Minimization (ERM) problem based on minimizing cross entropy loss;
  optimizing an area under a receiver operating characteristic curve (AUC) or a precision-recall curve (AUPRC) curve using a stochastic primal-dual method configured for optimizing a plurality of layers of the deep learning model;

receiving an input into a deep neural network;

processing the input to the deep neural network to generate a prediction, wherein the prediction comprises a classification of the input;

wherein said computer-based automated method is performed by executing instructions in at least one processor, and wherein said instructions are stored on a non-transitory memory readable by the at least one processor.

18. The method of claim 17 further comprising performing pre-training on the deep learning model.

19. The method of claim 17 wherein the classification is a multi-task classification.

20. A computer-based automated method of performing classification by stochastic optimization of averaged precision, the method comprising:

learning a deep neural network by maximizing an area under a precision-recall curve (AUPRC) using a stochastic optimization method configured for the deep neural network to iteratively adjust model parameters of the deep neural network to maximize averaged precision, thereby optimizing the AUPRC during the learning;

receiving an input into the deep neural network;

processing the input to the deep neural network to generate a prediction, wherein the prediction comprises a classification of the input;

wherein said computer-based automated method is performed by executing instructions in at least one processor, and wherein said instructions are stored on a non-transitory memory readable by the at least one processor.

* * * * *